United States Patent
Zhang et al.

(10) Patent No.: US 12,531,031 B2
(45) Date of Patent: Jan. 20, 2026

(54) DRIVE CONTROL CIRCUIT, GATE DRIVE CIRCUIT AND DISPLAY PANEL

(71) Applicants: Chengdu BOE Optoelectronics Technology Co., Ltd., Sichuan (CN); BOE Technology Group Co., Ltd., Beijing (CN)

(72) Inventors: Tiaomei Zhang, Beijing (CN); Wenbo Chen, Beijing (CN); Mengqi Wang, Beijing (CN); Jianpeng Wu, Beijing (CN); Ziyang Yu, Beijing (CN); Tianyi Cheng, Beijing (CN); Zhiliang Jiang, Beijing (CN); Ming Hu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 24 days.

(21) Appl. No.: 18/557,045

(22) PCT Filed: Dec. 13, 2022

(86) PCT No.: PCT/CN2022/138832
§ 371 (c)(1),
(2) Date: Oct. 24, 2023

(87) PCT Pub. No.: WO2024/124414
PCT Pub. Date: Jun. 20, 2024

(65) Prior Publication Data
US 2025/0087165 A1    Mar. 13, 2025

(51) Int. Cl.
*G09G 3/3266* (2016.01)
*G09G 3/32* (2016.01)

(52) U.S. Cl.
CPC ............ *G09G 3/3266* (2013.01); *G09G 3/32* (2013.01); *G09G 2310/0267* (2013.01); *G09G 2310/08* (2013.01); *G09G 2330/021* (2013.01)

(58) Field of Classification Search
CPC ... G11C 19/28–287; G09G 3/32–3291; G09G 2310/0267; G09G 2310/0286;
(Continued)

(56) References Cited

U.S. PATENT DOCUMENTS

2020/0143730 A1* 5/2020 Zheng .................. G09G 3/20
2021/0358365 A1* 11/2021 Feng .................... G09G 3/3677
(Continued)

FOREIGN PATENT DOCUMENTS

CN    106023943 A    10/2016
CN    111508433 A    8/2020
(Continued)

*Primary Examiner* — Amr A Awad
*Assistant Examiner* — Aaron Midkiff
(74) *Attorney, Agent, or Firm* — Ling Wu; Stephen Yang; Ling and Yang Intellectual Property

(57) ABSTRACT

A drive control circuit includes an input circuit, a first output circuit and a first output control circuit. An input circuit is configured to control the potentials of a first node and a second node under the control of a signal input terminal and a clock signal terminal. The first output circuit is configured to provide a first power supply signal to a third node under the control of a first node or to provide a second power supply signal to a first output terminal under the control of a second node. The first output control circuit is configured to turn on or turn off the third node and the first output terminal under the control of the first control terminal.

17 Claims, 10 Drawing Sheets

(58) Field of Classification Search
CPC ... G09G 2310/08; G09G 2330/02–028; G09G 2340/0435; G09G 2340/0407; G09G 2300/0809–0866; G09G 3/20; G09G 3/3266; G09G 2310/061–063; G09G 2330/021; G01R 19/00
See application file for complete search history.

(56) References Cited

U.S. PATENT DOCUMENTS

| | | | |
|---|---|---|---|
| 2022/0051608 A1 | 2/2022 | Shang et al. | |
| 2022/0076618 A1* | 3/2022 | Lai | G09G 3/3266 |
| 2022/0114938 A1 | 4/2022 | Feng et al. | |
| 2022/0343841 A1* | 10/2022 | Shang | G09G 3/3225 |

FOREIGN PATENT DOCUMENTS

| | | | |
|---|---|---|---|
| CN | 112927643 A | 6/2021 | |
| CN | 112992071 A | 6/2021 | |
| CN | 113711298 A | 11/2021 | |
| CN | 113889022 A | 1/2022 | |
| CN | 113920924 A | 1/2022 | |
| CN | 215895935 U | 2/2022 | |

\* cited by examiner

DRIVE CONTROL CIRCUIT, GATE DRIVE CIRCUIT AND DISPLAY PANEL

CROSS-REFERENCE TO RELATED APPLICATION

This application is a national stage application of PCT Application No. PCT/CN2022/138832, which is filed on Dec. 13, 2022 and entitled "Drive Control Circuit, Gate Drive Circuit and Display Panel", the content of which should be regarded as being incorporated herein by reference.

TECHNICAL FIELD

The present disclosure relates to, but is not limited to, the field of display technology, in particular to a drive control circuit, a gate drive circuit, and a display panel.

BACKGROUND

An Organic Light Emitting Diode (OLED) and a Quantum dot Light Emitting Diode (QLED) are active light emitting display devices and have advantages of self-luminescence, a wide viewing angle, a high contrast ratio, low power consumption, an extremely high response speed, lightness and thinness, bendability, and a low cost, etc.

SUMMARY

The following is a summary of subject matter described herein in detail. The summary is not intended to limit the protection scope of claims.

Embodiments of the present disclosure provide a drive control circuit, a gate drive circuit, and a display panel.

In one aspect, the present embodiment provides a drive control circuit, including an input circuit, a first output circuit, and a first output control circuit. The input circuit is electrically connected with a signal input terminal, a clock signal terminal, a first node and a second node, and is configured to control potentials of the first node and the second node under control of the signal input terminal and the clock signal terminal. The first output circuit is electrically connected to the first node, the second node, the third node, and the first output terminal, and is configured to provide a first power supply signal to the third node under the control of the first node, or to provide a second power supply signal to the first output terminal under the control of the second node. The first output control circuit is electrically connected with the third node, the first control terminal and the first output terminal, and is configured to turn on or turn off the third node and the first output terminal under the control of the first control terminal.

In some exemplary implementations, the first output control circuit includes a first output control transistor, wherein a gate of the first output control transistor is electrically connected to the first control terminal, a first electrode of the first output control transistor electrically is connected to the third node, and a second electrode of the first output control transistor is electrically connected to the first output terminal.

In some exemplary implementations, the first output circuit includes a first output transistor and a second output transistor, wherein a gate of the first output transistor is electrically connected with the first node, a first electrode of the first output transistor is electrically connected with the first power supply line, and a second electrode of the first output transistor is electrically connected with the third node; and a gate of the second output transistor is electrically connected to the second node, a first electrode of the second output transistor is electrically connected to the second power supply line, and a second electrode of the second output transistor is electrically connected to the first output terminal.

In some exemplary implementations, the drive control circuit further includes a second output circuit and a second output control circuit. The second output circuit is electrically connected to the first node, the second node, the fourth node, and the second output terminal, and is configured to provide a third power supply signal to the fourth node under the control of the first node, or to provide a fourth power supply signal to the second output terminal under the control of the second node. The second output control circuit is electrically connected with the fourth node, the second control terminal and the second output terminal, and is configured to turn on or turn off the fourth node and the second output terminal under the control of the second control terminal.

In some exemplary implementations, an output signal of the second output terminal is the same as an output signal of the first output terminal.

In some exemplary implementations, the second output control circuit includes a second output control transistor, wherein a gate of the second output control transistor is electrically connected to the second control terminal, a first electrode of the second output control transistor is electrically connected to the fourth node, and a second electrode of the second output control transistor is electrically connected to the second output terminal.

In some exemplary implementations, the second output circuit includes a third output transistor and a fourth output transistor, wherein a gate of the third output transistor is electrically connected to the first node, a first electrode of the third output transistor is electrically connected to a third power supply line, and a second electrode of the third output transistor is electrically connected to the fourth node; and a gate of the fourth output transistor is electrically connected to the second node, a first electrode of the fourth output transistor is electrically connected to the fourth power supply line, and a second electrode of the fourth output transistor is electrically connected to the second output terminal.

In some exemplary implementations, the input circuit includes a first transistor, a second transistor, a third transistor, a fourth transistor, a fifth transistor, a sixth transistor, a seventh transistor, an eighth transistor, a first capacitor, a second capacitor, and a third capacitor. A gate electrode of the first transistor is electrically connected with a first clock terminal, a first electrode of the first transistor is electrically connected with the signal input terminal, and a second electrode of the first transistor is electrically connected with a seventh node; a gate electrode of the second transistor is electrically connected with the seventh node, a first electrode of the second transistor is electrically connected with the first clock terminal, and a second electrode of the second transistor is electrically connected with the fifth node; a gate electrode of the third transistor is electrically connected with the first clock terminal, a first electrode of the third transistor is electrically connected with the second power supply line, and a second electrode of the third transistor is electrically connected with the fifth node; a gate electrode of the fourth transistor is electrically connected with a second clock terminal, a first electrode of the fourth transistor is electrically connected with a ninth node, and a second electrode of the fourth transistor is electrically connected with the seventh node; a gate electrode of the fifth transistor is electrically connected with the fifth node, a first electrode of the fifth transistor is electrically connected with the first power supply line, and a second electrode of the fifth transistor is electrically connected with the ninth node; a gate electrode of the sixth transistor is electrically connected with a sixth node, a first electrode of the sixth transistor is electrically connected with the second clock terminal, and a second electrode of the sixth transistor is electrically connected with an eighth node; a gate of the seventh transistor is electrically connected with the second clock terminal, a first electrode of the seventh transistor is electrically connected with the eighth node, and a second electrode of the seventh transistor is electrically connected with the first node; a gate of the eighth transistor is electrically connected with the second node, a first electrode of the eighth transistor is electrically connected with the first power supply line, and a second electrode of the eighth transistor is electrically connected with the second node; a first electrode plate of the first capacitor is electrically connected with the first node, and a second electrode plate of the first capacitor is electrically connected with the first power supply line; a first electrode plate of the second capacitor is electrically connected with the sixth node, and a second electrode plate of the second capacitor is electrically connected with the eighth node; and a first electrode plate of the third capacitor is electrically connected with the second clock terminal, and a second electrode plate of the third capacitor is electrically connected with the second node.

In some exemplary implementations, the input circuit further includes a first voltage stabilizing transistor and a second voltage stabilizing transistor, wherein a gate of the first voltage stabilizing transistor is electrically connected with the second power supply line, a first electrode of the first voltage stabilizing transistor is electrically connected with the fifth node, and a second electrode of the first voltage stabilizing transistor is electrically connected with the sixth node; a gate of the second voltage stabilizing transistor is electrically connected with the second power supply line, a first electrode of the second voltage stabilizing transistor is electrically connected with the seventh node, and a second electrode of the second voltage stabilizing transistor is electrically connected with the second node.

In another aspect, the present embodiment provides a gate drive circuit, including a plurality of cascaded drive control circuits as described above. Herein, a signal input terminal of a first stage drive control circuit is electrically connected with a start signal line, and a signal input terminal of an (i+1)-th stage drive control circuit is electrically connected with a first output terminal of an i-th stage drive control circuit, wherein, i is an integer greater than 0.

In another aspect, the present embodiment provides a drive method of a drive control circuit, which is applied to the drive control circuit as described above. The drive method includes that an input circuit controls potentials of the first node and the second node under the control of a signal input terminal and a clock signal terminal; in a first drive mode, the first output control circuit turns on the third node and the first output terminal under the control of the first control terminal, and the first output circuit provides a first power supply signal to the third node under the control of the first node, or provides a second power supply signal to the first output terminal under the control of the second node; and in the second drive mode, the first output control circuit turns off the third node and the first output terminal under the control of the first control terminal, and the first output circuit provides a second power supply signal to the first output terminal under the control of the second node.

In some exemplary implementations, the drive method further includes that in a first drive mode, the second output control circuit turns on the fourth node and the second output terminal under the control of the second control terminal, and the second output circuit provides a third power supply signal to the fourth node under the control of the first node, or provides a fourth power supply signal to the second output terminal under the control of the second node; and in a second drive mode, the second output control circuit turns off the fourth node and the second output terminal under the control of the second control terminal, and the second output circuit provides a fourth power supply signal to the second output terminal under the control of the second node.

In another aspect, an embodiment of the present disclosure provide a display panel including a display region and a non-display region located at a periphery of the display region; the display region is provided with a plurality of sub-pixels, and at least one sub-pixel includes a pixel circuit and a light emitting element, wherein the pixel circuit is electrically connected with the light emitting element; and the non-display region is provided with a gate drive circuit including a plurality of cascaded drive control circuits. The pixel circuit at least includes a drive sub-circuit, a threshold compensation sub-circuit and a first reset sub-circuit; the drive sub-circuit, the threshold compensation sub-circuit and the first reset sub-circuit are electrically connected with the first pixel node; the threshold compensation sub-circuit and the drive sub-circuit are electrically connected with the third pixel node; the first reset sub-circuit is configured to reset the first pixel node under the control of the first reset control signal; the threshold compensation sub-circuit is configured to turn on the first pixel node and the third pixel node under the control of the second scan signal; and the drive sub-circuit is configured to provide a drive signal to the third pixel node under the control of the first pixel node. The drive control circuit is electrically connected with the first control line and the first output terminal, and is configured to provide the second scan signal or the first reset control signal to the pixel circuit through the first output terminal under the control of the first control line.

In some exemplary implementations, the drive sub-circuit includes a drive transistor, wherein a gate of the drive transistor is electrically connected to the first pixel node, a first electrode of the drive transistor is electrically connected to the second pixel node, and a second electrode of the drive transistor is electrically connected to the third pixel node; the threshold compensation sub-circuit includes a threshold compensation transistor, wherein a gate of the threshold compensation transistor is electrically connected with the second scan line, a first electrode of the threshold compensation is electrically connected with the first pixel node, and a second electrode of the threshold compensation is electrically connected with the third pixel node; the first reset sub-circuit includes a first reset transistor, wherein a gate of the first reset transistor is electrically connected with the first reset control line, a first electrode of the first reset transistor is electrically connected with the first initial signal line, and a second electrode of the first reset transistor is electrically connected with the first pixel node; and the threshold compensation transistor and the first reset transistor have the same transistor type, and the threshold compensation transistor and the drive transistor have different transistor types.

In some exemplary implementations, the display region at least includes a first sub-display region and a second sub-display region, and a refresh rate of the first sub-display region is different from a refresh rate of the second sub-display region.

In some exemplary implementations, the pixel circuit has a first operation mode and a second operation mode; the pixel circuit is configured to perform a reset, a data writing, and a threshold compensation on the first pixel node in the first operation mode; and the pixel circuit is configured to not perform at least one of the following in the second operation mode: a reset on the first pixel node, a data writing on the first pixel node, and a threshold compensation on the first pixel node.

In some exemplary implementations, the display region at least includes a first sub-display region and a second sub-display region, wherein a pixel circuit of the first sub-display region is configured to be in a first operation mode in one frame under the control of the drive control circuit, and a pixel circuit of the second sub-display region is configured to be in a second operation mode in the same frame.

In some exemplary implementations, the drive control circuit has a first drive mode and a second drive mode. The drive control circuit is configured to provide an output signal of the first output terminal to the pixel circuit in the first drive mode so that the pixel circuit is in the first operation mode, and is further configured to provide an output signal of the first output terminal to the pixel circuit in the second drive mode so that the pixel circuit is in the second operation mode.

In some exemplary implementations, the drive control circuit is also electrically connected to a second control line and a second output terminal. The drive control circuit is configured to provide the second scan signal to at least one pixel circuit through the first output terminal under the control of the first control line, and to provide the first reset control signal to at least one pixel circuit through the second output terminal under the control of the second control line.

In some exemplary implementations, the (j+5)-th stage drive control circuit is configured to provide a first reset control signal to pixel circuits of the (j+5)-th row through the second output terminal, and to provide a second scan signal to pixel circuits of a j-th row through the first output terminal, wherein j is an integer.

In some exemplary implementations, the display panel further includes a data processing unit, which is configured to provide a first control signal to the drive control circuit through a first control line, and to provide a second control signal to the drive control circuit through a second control line according to a type of picture to be displayed.

In another aspect, an embodiment provides a display apparatus, including the aforementioned display panel.

Other aspects may be understood upon reading and understanding the drawings and detailed description.

BRIEF DESCRIPTION OF DRAWINGS

Accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of one or more components in the drawings do not reflect actual scales, and are only intended to schematically describe contents of the present disclosure.

DETAILED DESCRIPTION

Figure 1:
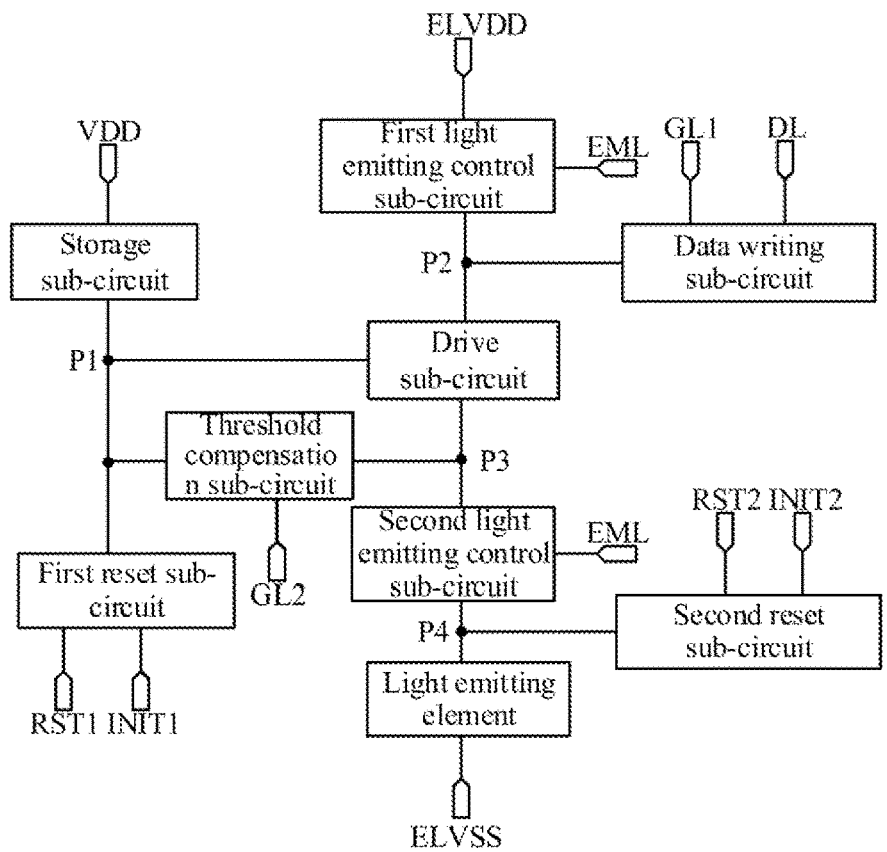
FIG. 1 is a schematic diagram of a pixel circuit according to at least one embodiment of the present disclosure.

The embodiments of the present disclosure will be described below with reference to the drawings in detail. Implementations may be practiced in a plurality of different forms. Those of ordinary skills in the art may easily understand such a fact that implementations and contents may be transformed into one or more forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of one or more constituent elements, a thickness of a layer, or a region is sometimes exaggerated for clarity. Therefore, one mode of the present disclosure is not necessarily limited to the size, and a shape and a size of one or more components in the drawings do not reflect an actual scale. In addition, the drawings schematically illustrate ideal examples, and one implementation of the present disclosure is not limited to shapes, numerical values, or the like shown in the drawings.

Ordinal numerals such as "first", "second" and "third" in the present disclosure are set to avoid confusion between constituent elements, but not intended for restriction in quantity. In the present disclosure, "a plurality/multiple" represents two or more than two.

In the present disclosure, for convenience, wordings "central", "up", "down", "front", "back", "vertical", "horizontal", "top", "bottom", "inside", "outside" and the like indicating orientation or positional relationships are used to illustrate positional relationships between constituent elements with reference to the drawings, which are only used to facilitate describing the present specification and simplify the description, rather than indicating or implying that involved devices or elements must have specific orientations and be structured and operated in the specific orientations, and thus should not be understood as limitations on the present disclosure. The positional relationships between the constituent elements are changed as appropriate based on directions for describing the constituent elements. Therefore, appropriate replacements may be made according to situations without being limited to the wordings described in the specification.

In the present disclosure, unless otherwise specified and defined, terms "mounting", "mutual connection" and "connection" should be understood in a broad sense. For example, a connection may be a fixed connection, or a detachable connection, or an integrated connection; it may be a mechanical connection or an electrical connection; and it may be a direct mutual connection, or an indirect connection through middleware, or an internal communication between two elements. Those of ordinary skills in the art may understand meanings of the above-mentioned terms in the present disclosure according to situations. Among them, an "electrical connection" includes a case where constituent elements are connected together through an element with a certain electrical effect. The "element with the certain electrical effect" is not particularly limited as long as electrical signals between the connected constituent elements may be transmitted. Examples of the "element with the certain electrical effect" not only include electrodes and wirings, but also include switching elements such as transistors, resistors, inductors, capacitors, other elements with one or more functions, etc.

In the present disclosure, a transistor refers to an element at least including three terminals, i.e., a gate electrode (gate), a drain electrode, and a source electrode. The transistor has a channel area between the drain electrode (drain electrode terminal, drain region, or drain) and the source electrode (source electrode terminal, source region, or source), and a current can flow through the drain electrode, the channel region, and the source electrode. In the present disclosure, the channel region refers to a region through which a current mainly flows.

In the present disclosure, to distinguish two electrodes of a transistor except the gate electrode, one of the electrodes is referred to as a first electrode and the other electrode is referred to as a second electrode. The first electrode may be a source electrode or a drain electrode, and the second electrode may be a drain electrode or a source electrode. In addition, the gate electrode of the transistor may be referred to as a control electrode. In cases that transistors with opposite polarities are used, a current direction changes during operation of a circuit, or the like, functions of the "source electrode" and the "drain electrode" are sometimes interchanged. Therefore, the "source electrode" and the "drain electrode" are interchangeable in the present disclosure.

In the present disclosure, "parallel" refers to a state in which an angle formed by two straight lines is above −10° and below 10°, and thus may include a state in which the angle is above −5° and below 5°. In addition, "perpendicular" refers to a state in which an angle formed by two straight lines is above 80° and below 100°, and thus may include a state in which the angle is above 85° and below 95°.

In the present disclosure, "about", "approximate" and "approximately" refer to a case that a boundary is defined not so strictly and a process and measurement error within a range is allowed.

With the rapid development of the display industry, the display screen using active light-emitting display devices is used in all walks of life, such as mobile phones, bracelets, watches, car displays, notebook computers, televisions and so on. With the continuous development of games and other industries that require higher refresh rate, consumers have higher and higher requirements for display screens, and display screens with high refresh or even ultra-high refresh are gradually needed by all walks of life. However, after the refresh frequency of the display screen increases as a whole, the accompanying display power consumption will increase, which will lead to the decrease of standby time of the display products and cause poor use experience for consumers.

The present embodiment provides a drive control circuit, a gate drive circuit and a display panel, which may reduce the power consumption of the display panel.

In some exemplary implementations, the display panel may include a display region and a non-display region located at a periphery of the display region. For example, the non-display region may be located at a periphery of the display region. However, this embodiment is not limited thereto. The display region may at least include a plurality of sub-pixels, a plurality of gate lines (for example, including a scan line, and a reset control line) and a light emitting control line extending along a first direction, and a plurality of data lines extending along a second direction. At least one sub-pixel may include a pixel circuit and a light emitting element. Each pixel circuit is electrically connected to a light emitting element, and is configured to drive the light emitting element to emit light. Herein, the first direction and the second direction may be in a same plane, and the first direction may intersect with the second direction. For example, the first direction may be perpendicular to the second direction. The non-display region may be provided with at least one gate drive circuit. Each gate drive circuit may include a plurality of cascaded drive control circuits. The gate drive circuit may be configured to provide a gate drive signal (e.g. a scan signal, a reset control signal and the like) to a pixel circuit of the display region.

FIG. 1 is a schematic diagram of a pixel circuit according to at least one embodiment of the present disclosure. In some examples, as shown in FIG. 1, the pixel circuit of the present example may include a data writing sub-circuit, a drive sub-circuit, a threshold compensation sub-circuit, a storage sub-circuit, a first light emitting control sub-circuit, a second light emitting control sub-circuit, a first reset sub-circuit, and a second reset sub-circuit.

In some examples, as shown in FIG. 1, the data writing sub-circuit is electrically connected to a first scan line GL1, a data line DL, and a second pixel node P2, and is configured to write a data signal provided by the data line DL to the second pixel node P2 under the control of the first scan line GL1. The drive sub-circuit is electrically connected to the first pixel node P1, the second pixel node P2 and the third pixel node P3, and is configured to provide a drive signal to the third pixel node P3 under the control of the first pixel node P1. The first light emitting control sub-circuit is electrically connected to the second pixel node P2, a first pixel power supply line ELVDD, and a light emitting control line EML, and is configured to provide a first pixel power supply signal transmitted by the first pixel power supply line ELVDD to the second pixel node P2 under the control of the light emitting control line EML. The second light emitting control sub-circuit, together with the third pixel node P3, the fourth pixel node P4 and the light emitting control line EML, is configured to turn on the third pixel node P3 and the fourth pixel node P4 under the control of the light emitting control line EIL. The first reset sub-circuit is configured to reset the first pixel node P1. The first reset sub-circuit is electrically connected to the first pixel node P1, the first reset control line RST1, and the first initial signal line INIT1, and is configured to provide a first initial signal transmitted by the first initial signal line INIT1 to the first pixel node P1 under the control of the first reset control line RST1. The second reset sub-circuit is configured to reset the fourth pixel node P4. The second reset sub-circuit is electrically connected to the fourth pixel node P4, the second reset control line RST2, and the second initial signal line INIT2, and is configured to provide a second initial signal transmitted by the second initial signal line INIT2 to the fourth pixel node P4 under the control of the second reset control line RST2. The threshold compensation sub-circuit is electrically connected to the first pixel node P1, the third pixel node P3 and a second scan line GL2, and is configured to turn on the first pixel node P1 and the third pixel node P3 under the control of the second scan line GL2. The storage sub-circuit is electrically connected to the first pixel node P1 and the first pixel power supply line ELVDD, and is configured to keep a potential of the first pixel node P1.

Figure 2:
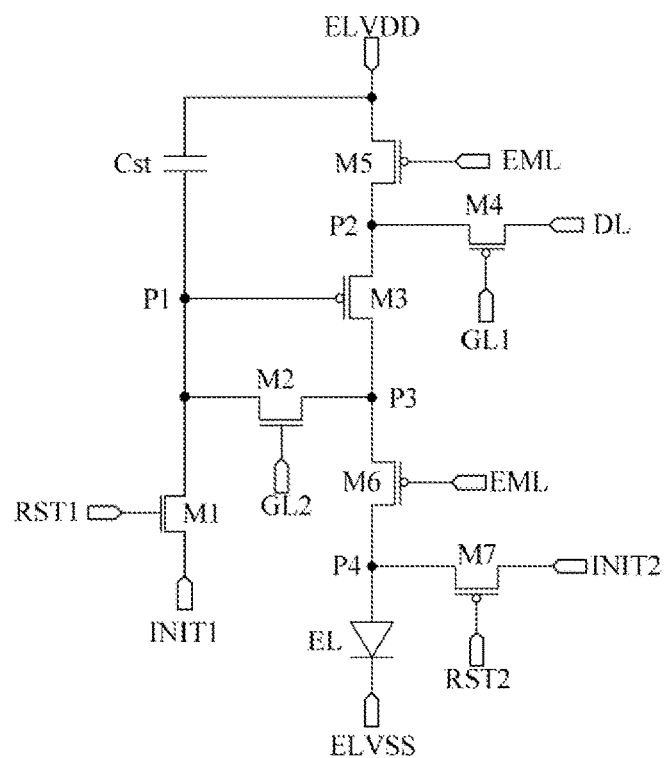
FIG. 2 is an equivalent circuit diagram of a pixel circuit according to at least one embodiment of the present disclosure.
Figure 3:
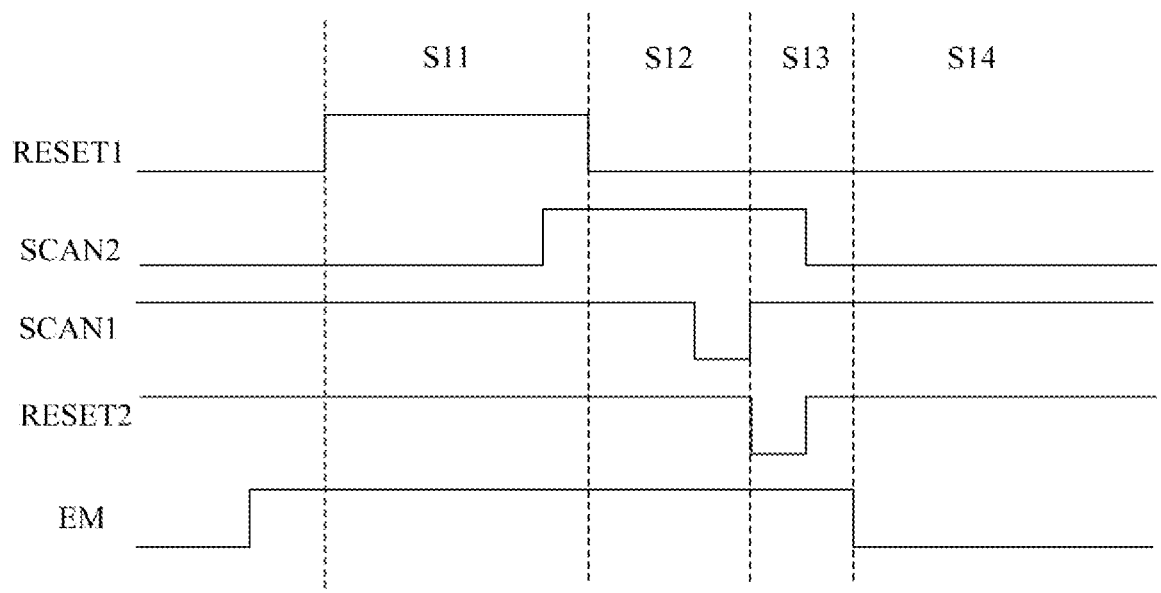
FIG. 3 is a working timing diagram of the pixel circuit provided in FIG. 2.

FIG. 2 is an equivalent circuit diagram of a pixel circuit according to at least one embodiment of the present disclosure. FIG. 3 is a working timing diagram of the pixel circuit provided in FIG. 2. The pixel circuit of the present exemplary embodiment is described by taking an 7T1C structure as an example. However, this embodiment is not limited thereto.

In some examples, as shown in FIG. 2, the drive sub-circuit may include a drive transistor M3; the data writing sub-circuit may include a data writing transistor M4; the threshold compensation sub-circuit may include a threshold compensation transistor M2; the first light emitting control sub-circuit may include a first light emitting control transistor M5; the second light emitting control sub-circuit may include a second light emitting control transistor M6; the first reset sub-circuit may include a first reset transistor M1; the second reset sub-circuit may include a second reset transistor M7; and the storage sub-circuit may include a storage capacitor Cst. The light emitting element EL may include an anode, a cathode and an organic emitting layer arranged between the anode and the cathode. In some examples, the organic light-emitting layer may include a multi-layer structure formed by one or more film layers selected from an Emitting Layer (EML), a Hole Injection Layer (HIL), a Hole Transport Layer (HTL), a Hole Block Layer (HBL), an Electron Block Layer (EBL), an Electron Injection Layer (EIL), and an Electron Transport Layer (ETL). For example, under the drive of voltages of the anode and the cathode, the organic light-emitting layer may emit light according to the required gray scale using light emitting properties of the organic materials.

In some examples, the seven transistors in the pixel circuit may include P-type transistors and N-type transistors. For example, the first reset transistor M1 and the threshold compensation transistor M2 of the pixel circuit may be N-type transistors, and remaining transistors of the pixel circuit may be P-type transistors. In some other examples, the seven transistors of the pixel circuit may be P-type transistors, or may be N-type transistors. Using a same type of transistors in a pixel circuit may simplify a process flow, reduce a process difficulty of a display substrate, and improve a yield of products.

In some examples, low temperature polysilicon thin film transistors, or oxide thin film transistors, or a low temperature polysilicon thin film transistor and an oxide thin film transistor, may be adopted for seven transistors in a pixel circuit. For example, the first reset transistor M1 and the threshold compensation transistor M2 of the pixel circuit may be oxide thin film transistors, and the remaining transistors of the pixel circuit may be low temperature polysilicon thin film transistors. An active layer of a low temperature poly-crystalline silicon thin film transistor is made of Low Temperature Poly-crystalline Silicon (LTPS), and an active layer of an oxide thin film transistor is made of an oxide semiconductor (Oxide). A Low-temperature Poly Silicon thin film transistor has advantages such as a high mobility rate and fast charging, and an oxide thin film transistor has advantages such as a low leakage current. The Low Temperature Poly Silicon thin film transistor and the oxide thin film transistor are integrated on one display substrate to form a Low Temperature Polycrystalline Oxide (LTPS+Oxide) display substrate, and advantages of both the Low Temperature Poly Silicon thin film transistor and the oxide thin film transistor may be utilized, which may achieve low frequency drive, reduce power consumption, and improve display quality.

In some examples, as shown in FIG. 2, the first pixel power supply line ELVDD may be configured to provide a first pixel power supply signal with a constant high potential, and the second pixel power supply line ELVSS may be configured to provide a second pixel power supply signal with a constant low potential. The first scan line GL1 may be configured to provide a first scan signal SCAN1 to the pixel circuit, the data line DL may be configured to provide a data signal DATA to the pixel circuit, the light emitting control line EML may be configured to provide a light emitting control signal EM to the pixel circuit, the first reset control line RST1 may be configured to provide a first reset control signal RESET1 to the pixel circuit, and the second reset control line RST2 may be configured to provide a second reset signal RESET2 to the pixel circuit.

In some examples, in a pixel circuit of an n-th row, a second reset control line RST2 may be electrically connected with a first scan line GL1 of a pixel circuit of an (n−1)-th row, such that the second reset control line RST2 is inputted with a first scan signal SCAN1(n−1), that is, a second reset control signal RESET2 (n) may be the same as the first scan signal SCAN1 (n−1). Where n is an integer. Thus, signal lines of the display substrate may be reduced, and a narrow bezel design of the display substrate may be achieved. However, this embodiment is not limited thereto.

In some examples, the first initial signal line INIT1 is configured to provide a first initial signal to the pixel circuit, and the second initial signal line INIT2 is configured to provide a second initial signal to the pixel circuit. The magnitude of the first initial signal and the second initial signal may be the same or different. For example, the first initial signal and the second initial signal may be constant voltage signals whose magnitude may be between the first pixel power supply signal and the second pixel power supply signal, for example. However, this embodiment is not limited thereto.

In some examples, as shown in FIG. 2, a gate electrode of the data writing transistor M4 is electrically connected to the first scan line GL1, a first electrode of the data writing transistor M4 is electrically connected to the data line DL, and a second electrode of the data writing transistor M4 is electrically connected to a first electrode of the drive transistor M3. A gate of the threshold compensation transistor M2 is electrically connected with a second scan line GL2, a first electrode of the threshold compensation transistor M2 is electrically connected with a gate of the drive transistor M3, and a second electrode of the threshold compensation transistor M2 is electrically connected with a second electrode of the drive transistor M3. A gate of a first light emitting control transistor M5 is electrically connected with the light emitting control line EML, a first electrode of the first light emitting control transistor M5 is electrically connected with the first pixel power supply line ELVDD, and a second electrode of the first light emitting control transistor M5 is electrically connected with the first electrode of the drive transistor M3. A gate of the second light emitting control transistor M6 is electrically connected with the light emitting control line EML, a first electrode of the second light emitting control transistor M6 is electrically connected with the second electrode of the drive transistor M3, and a second electrode of the second light emitting control transistor M6 is electrically connected with an anode of the light emitting element EL. A gate of the first reset transistor M1 is electrically connected with the first reset control line RST1, a first electrode of the first reset transistor M1 is electrically connected with a first initial signal line INIT1, and a second electrode of the first reset transistor M1 is electrically connected with the gate of the drive transistor M3. A gate of the second reset transistor M7 is electrically connected with the second reset control line RST2, a first electrode of the second reset transistor M7 is electrically connected with a second initial signal line INIT2, and a second electrode of the second reset transistor M7 is electrically connected with the anode of the light emitting element EL. A first electrode plate of the storage capacitor Cst is electrically connected with the gate of the drive transistor M3, and a second electrode plate of the storage capacitor Cst is electrically connected with the first pixel power supply line ELVDD. The anode of the light emitting element EL is electrically connected to the fourth pixel node P4, and the cathode of the light emitting element EL is electrically connected to the second pixel power supply line ELVSS.

In this example, the first pixel node P1 is a connection point for the second electrode plate of the storage capacitor Cst, the first electrode of the first reset transistor M1, the gate of the drive transistor M3, and the first electrode of the threshold compensation transistor M2; the second pixel node P2 is a connection point for the second electrode of the first light emitting control transistor M5, the second electrode of the data writing transistor M4, and the first electrode of the drive transistor M3; the third pixel node P3 is a connection point for the second electrode of the drive transistor M3, the second electrode of the threshold compensation transistor M2, and the first electrode of the second light emitting control transistor M6; and the fourth pixel node P4 is a connection point for the second electrode of the second light emitting control transistor M6, the second electrode of the second reset transistor M7, and the anode of the light emitting element EL.

A working process of the pixel circuit shown in FIG. 2 will be described below with reference to FIG. 3. Herein, it is illustrated by taking that the first reset transistor M1 and the threshold compensation transistor M2 are N-type transistors, and the drive transistor M3, the data writing transistor M4, the first light emitting control transistor M5, the second light emitting control transistor M6, and the second reset transistor M7 of the pixel circuit shown in FIG. 2 are all P-type transistors as examples.

In some examples, as shown in FIG. 3, during one frame display period, the working process of the pixel circuit may include a first stage S11, a second stage S12, a third stage S13, and a fourth stage S14.

The first stage S11 is referred to as a reset stage. The first reset control signal RESET1 provided by the first reset control line RST1 is a high-level signal, and the first reset transistor M1 is turned on. The first initial signal provided by the first initial signal line INIT1 is provided to the first pixel node P1 to initialize the first pixel node P1 and clear the original data voltage in the storage capacitor Cst. The first scan signal SCAN1 provided by the first scan line GL1 is a high-level signal, and the data writing transistor M4 is turned off. The second scan signal SCAN2 provided by the second scan line GL2 is a low-level signal, and the threshold compensation transistor M2 is turned off. The second reset control signal RESET2 provided by the second reset control line RST2 is a high-level signal, and the second reset transistor M7 is turned off. The light emitting control signal EM provided by the light emitting control line EML2 is a high-level signal, and both the first light emitting control transistor M5 and the second light emitting control transistor M6 are turned off. In this stage, the light emitting element EL does not emit light.

A second stage S12 is referred to as a data writing stage or a threshold compensation stage. The second scan signal SCAN2 provided from the second scan line GL2 is a high-level signal, and the threshold compensation transistor M2 is turned on. The first scan signal SCAN1 provided by the first scan line GL2 is switched to a low-level signal, and the data writing transistor M4 is turned on. In this phase, the first electrode plate of the storage capacitor Cst is at a low-level, such that the drive transistor M3 is turned on. The threshold compensation transistor M2 and the data writing transistor M4 are turned on, so that the data voltage output by the data line DL is written to the transistor M4 through turned-on data. The second pixel node P2, the turned-on drive transistor M3, the third pixel node P3, and the turned-on threshold compensation transistor M2 are provided to the first pixel node P1, and the difference between the data voltage output by the data line DL and the threshold voltage of the drive transistor M3 is charged into the storage capacitor Cst. The voltage of the first electrode plate of the storage capacitor Cst (that is, the first pixel node P1) is Vdata-IVthl, where Vdata is the data voltage output from the data line DL, and Vth is the threshold voltage of the drive transistor M3. The second reset control signal RESET2 provided by the second reset control line RST2 is a high-level signal, and the second reset transistor M7 is turned off. The first reset control signal RESET1 provided by the first reset control line RST1 is a low-level signal, and the first reset transistor M1 is turned off. The light emitting control signal EM provided by the light emitting control line EML is a high-level signal, and both the first light emitting control transistor M5 and the second light emitting control transistor M6 are turned off. In this stage, the light emitting element EL does not emit light.

The third stage S13 is referred to as an anode reset stage. The second reset control signal RESET2 provided by the second reset control line RST2 is switched to a low-level signal, and the second reset transistor M7 is turned on, so that the second initial signal provided by the second initial signal line INIT2 is provided to the fourth pixel node P4 to reset the anode of the light emitting element EL. The first reset control signal RESET1 provided by the first reset control line RST1 is a low-level signal, and the first reset transistor M1 is turned off. The light emitting control signal EM provided by the light emitting control line EML is a high-level signal, and the first light emitting control transistor M5 and the second light emitting control transistor M6 are turned off. The first scan signal SCAN1 provided by the first scan line GL1 is a high-level signal, and the data writing transistor M4 is turned off, and the second scan signal SCAN2 provided by the second scan line GL2 is switched from a high-level signal to a low-level signal. After the data writing transistor M4 is turned off, the threshold compensation transistor M2 may be turned on to complete the charge compensation process.

The fourth stage S14 is referred to as a light emitting stage. The light emitting signal EM provided by the light emitting control signal line EML is a low-level signal, and the first light emitting control transistor M5 and the second light emitting control transistor M6 are turned on. The first pixel power supply signal with a high-level output by the first pixel power supply line ELVDD provides a drive signal to the anode of the light emitting element EL through the first light emitting control transistor M5, the drive transistor M3, and the second light emitting control transistor M6 which are turned to drive the light emitting element EL to emit light. The first scan signal SCAN1 provided by the first scan line GL1 is a high-level signal, and the data writing transistor M4 is turned off, and the second reset control signal RESET2 provided by the second reset control line RST2 is a high-level signal, and the second reset transistor M7 is turned off. The first reset control signal RESET1 provided by the first reset control line RST1 is a low-level signal, and the first reset transistor M1 is turned off, and the second scan signal SCAN2 provided by the second scan line GL2 is a low-level signal, and the threshold compensation transistor M2 is turned off.

In a drive process of the pixel circuit, a drive current flowing through the drive transistor M3 is determined by a voltage difference between the gate and the first electrode of the drive transistor M3. Because the voltage of the first pixel node P1 is Vdata-|Vth|, the drive current of the drive transistor M3 is as follows.

$$I = K \times (Vgs - Vth)^2 = K \times [(Vdd - Vdata + |Vth|) - Vth]^2 = K \times [(Vdd - Vdata]^2$$

where, I is the drive current flowing through the drive transistor M3, that is, the drive current for driving the light emitting element EL; K is a constant; Vgs is the voltage difference between the gate and the first electrode of the drive transistor M3; Vth is the threshold voltage of the drive transistor M3; Vdata is the data voltage output by the data line DL, and Vdd is the first pixel power supply signal output from the first pixel power supply line ELVDD.

It may be seen from the above formula that a current flowing through the light emitting element EL has nothing to do with the threshold voltage of the drive transistor M3. Therefore, the pixel circuit of this embodiment may better compensate the threshold voltage of the drive transistor M3.

In some exemplary implementations, the pixel circuit may have a first operation mode and a second operation mode. In the first operation mode, the working timing of the pixel circuit during one frame display period may be as shown in FIG. 3, in which processes of the first pixel node reset, data writing and threshold compensation and light emitting are achieved. In the second operation mode, the pixel circuit does not perform at least one of the following: a reset on the first pixel node, a data writing on the first pixel node, and a threshold compensation on the first pixel node. The pixel circuit does not write a data signal in the second operation mode, which may save power consumption. For example, in the second operation mode, the pixel circuit does not perform processes of a reset, a data writing, and a threshold compensation on the first pixel node.

Figure 4:
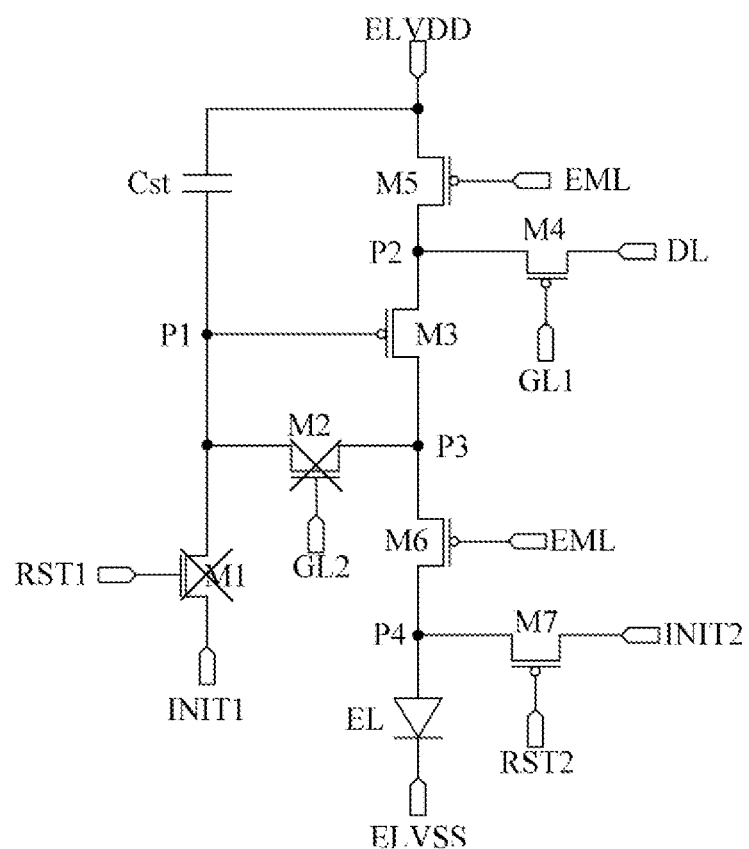
FIG. 4 is a schematic diagram of a pixel circuit according to at least one embodiment of the present disclosure in a second operation mode.

FIG. 4 is a schematic diagram of a pixel circuit according to at least one embodiment of the present disclosure in a second operation mode. In some examples, as shown in FIG. 4, in the second operation mode of the pixel circuit, the first reset control line RST1 and the second scan line GL2 may continuously provide low-level signals (i.e., the second reset control signal and the second scan signal are continuous low-level signals), so that the first reset transistor M1 and the threshold compensation transistor M2 of the pixel circuit may remain in an off state. The pixel circuit does not perform the reset stage of the first pixel node P1, and data writing and charging compensation cannot also be performed, so that the first pixel node P1 still maintains a voltage of the previous frame, thereby achieving a display with a low refresh frequency and achieving the effect of saving power consumption. For example, when the display substrate displays still images, the pixel circuit may be in the second operation mode, thereby achieving the effect of reducing power consumption. However, this embodiment is not limited thereto.

The present embodiment provides a drive control circuit, which may provide a second scan signal or a first reset control signal required by a first operation mode and a second operation mode to a pixel circuit of a display region, or provide a second scan signal and a first reset control signal.

Figure 5:
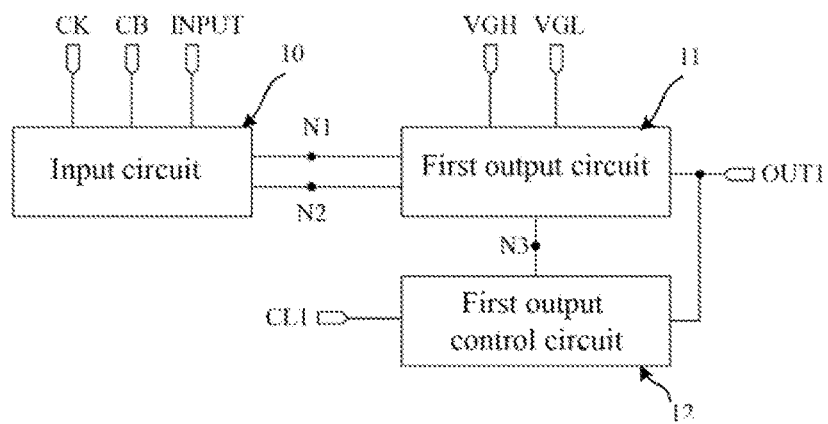
FIG. 5 is a schematic diagram of a drive control circuit according to at least one embodiment of the present disclosure.

FIG. 5 is a schematic diagram of a drive control circuit according to at least one embodiment of the present disclosure. In some examples, as shown in FIG. 5, the drive control circuit of the present example may include an input circuit 10, a first output circuit 11 and a first output control circuit 12. The input circuit 10 is electrically connected to a signal input terminal INPUT, a clock signal terminal (including, for example, a first clock terminal CK and a second clock terminal CB), a first node N1 and a second node N2, and is configured to control the potentials of the first node N1 and the second node N2 under the control of the signal input terminal INPUT and the clock signal terminal. The first output circuit 11 is electrically connected to the first node N1, the second node N2, the third node N3 and the first output terminal OUT1, and is configured to provide a first power supply signal transmitted by the first power supply line VGH to the third node N3 under the control of the first node N1, or to provide a second power supply signal transmitted by the second power supply line VGL to the first output terminal OUT1 under the control of the second node N2. The first output control circuit 12 is electrically connected to the third node N3, the first control terminal CL1 and the first output terminal OUT1, and is configured to turn on or turn off the third node N3 and the first output terminal OUT1 under the control of the first control terminal CL1.

In some examples, a first power supply signal provided by the first power supply line VGH may be greater than a second power supply signal provided by the second power supply line VGL. For example, the first power supply signal is a signal with a high-potential, and the second power supply signal is a signal with a low potential. However, this embodiment is not limited thereto.

The drive control circuit provided by the present example may achieve a selective output through the first output terminal (for example, only outputting a second power supply signal, or outputting signals whose effective signal is the first power supply signal) by arranging the first output control circuit to control whether the third node and the first output terminal are turned on or not, and thus may provide a second scan signal required in the first operation mode or the second operation mode to the pixel circuit through the first output terminal, or may provide a first reset control signal required in the first operation mode or the second operation mode to the pixel circuit. For example, when the third node and the first output terminal are turned on, the output signal of the first output terminal may control the pixel circuit to be in the first operation mode; and when the third node is turned off from the first output terminal, the output signal of the first output terminal may control the pixel circuit to be in the second operation mode.

Figure 6:
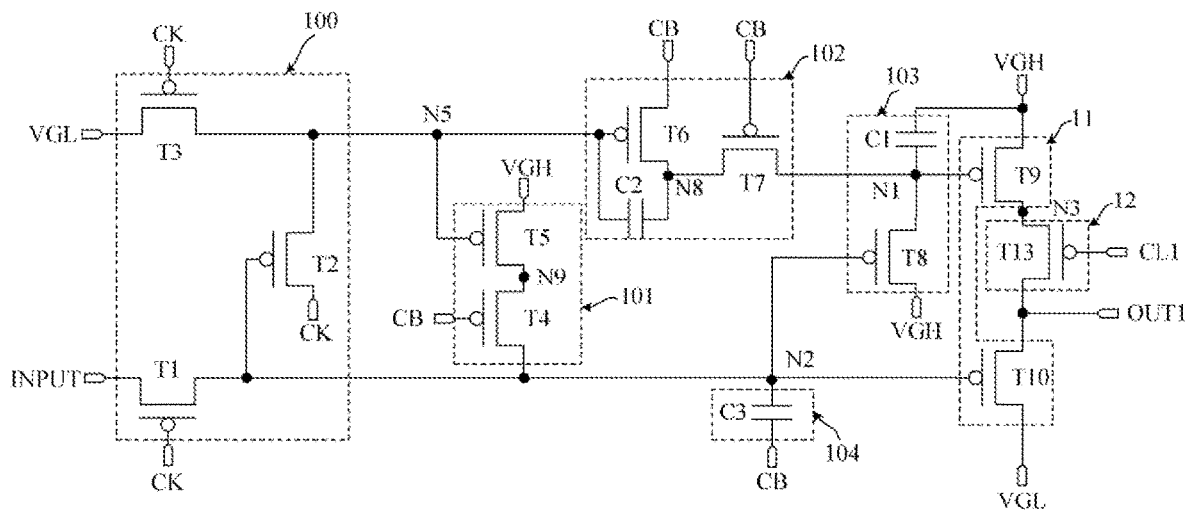
FIG. 6 is an equivalent circuit diagram of a drive control circuit according to at least one embodiment of the present disclosure.

FIG. 6 is an equivalent circuit diagram of a drive control circuit according to at least one embodiment of the present disclosure. In some examples, as shown in FIG. 6, the input circuit may include: an input sub-circuit 100, a first control sub-circuit 101, a second control sub-circuit 102, a third control sub-circuit 103 and a fourth control sub-circuit 104. The input sub-circuit 100 may be electrically connected to the signal input terminal INPUT, the first clock terminal CK, the second power supply line VGL, the fifth node N5, and the second node N2, and is configured to control the potentials of the second node N2 and the fifth node N5 under the control of the first clock terminal CK and the signal input terminal INPUT. The first control sub-circuit 101 may be electrically connected with the second node N2, the fifth node N5, the first power supply line VGH and the second clock terminal CB, and is configured to control a potential of the second node N2 under control of the fifth node N5 and the second clock terminal CB. The second control sub-circuit 102 may be electrically connected to the fifth node N5, the first node N1 and the second clock terminal CB, and is configured to control a potential of the first node N1 under the control of the fifth node N5 and the second clock terminal CB. The third control sub-circuit 103 may be electrically connected to the first node N1, the second node N2 and the first power supply line VGH, and is configured to control the potential of the first node N1 under the control of the second node N2. The fourth control sub-circuit 104 may be electrically connected to the second node N2 and the second clock terminal CB, and is configured to store a signal provided by the second clock terminal CB.

In some example, as shown in FIG. 6, the input sub-circuit 100 may include: a first transistor T1, a second transistor T2 and a third transistor T3. A gate of the first transistor T1 is electrically connected to the first clock terminal CK, a first electrode of the first transistor T1 is electrically connected to the signal input terminal INPUT, and a second electrode of the first transistor T1 is electrically connected to the second node N2. A gate of the second transistor T2 is electrically connected to the second node N2, a first electrode of the second transistor T2 is electrically connected to the first clock terminal CK, and a second electrode of the second transistor T2 is electrically connected to the fifth node N5. A gate of the third transistor T3 is electrically connected to the first clock terminal CK, a first electrode of the third transistor T3 is electrically connected to the second power supply line VGL, and a second electrode of the third transistor T3 is electrically connected to the fifth node N5. The first control sub-circuit 101 may include a fourth transistor T4 and a fifth transistor T5. A gate of the fourth transistor T4 is electrically connected to the second clock terminal CB, a first electrode of the fourth transistor T4 is electrically connected to the ninth node N9, and a second electrode of the fourth transistor T4 is electrically connected to the second node N2. A gate of the fifth transistor T5 is electrically connected to the fifth node N5, a first electrode of the fifth transistor T5 is electrically connected to the first power supply line VGH, and a second electrode of the fifth transistor T5 is electrically connected to the ninth node N9. The second control sub-circuit 102 may include: a sixth transistor T6, a seventh transistor T7 and a second capacitor C2. A gate of the sixth transistor T6 is electrically connected to the fifth node N5, a first electrode of the sixth transistor T6 is electrically connected to the second clock terminal CB, and a second electrode of the sixth transistor T6 is electrically connected to the eighth node N8. A gate of the seventh transistor T7 is electrically connected to the second clock terminal CB, a first electrode of the seventh transistor T7 is electrically connected to the eighth node N8, and a second electrode of the seventh transistor T7 is electrically connected to the first node N1. A first electrode plate of the second capacitor C2 is electrically connected to the fifth node N5, and a second electrode plate of the second capacitor C2 is electrically connected to the eighth node N8. The third control sub-circuit 103 may include an eighth transistor T8 and a first capacitor C1. A gate of the eighth transistor T8 is electrically connected to the second node N2, a first electrode of the eighth transistor T8 is electrically connected to the first power supply line VGH, and a second electrode of the eighth transistor T8 is electrically connected to the first node N1. A first electrode plate of the first capacitor C1 is electrically connected to the first node N1, and a second electrode plate of the first capacitor C1 is electrically connected to the first power supply line VGH. The fourth control sub-circuit 104 may include a third capacitor C3. A first electrode plate of the third capacitor C3 is electrically connected to the second node N2, and a second electrode plate of the third capacitor C3 is electrically connected to the second clock terminal CB.

In some examples, as shown in FIG. 6, the first output circuit 11 may include a first output transistor T9 and a second output transistor T10. A gate of the first output transistor T9 is electrically connected to the first node N1, a first electrode of the first output transistor T9 is electrically connected to the first power supply line VGH, and a second electrode of the first output transistor T9 is electrically connected to the third node N3. A gate of the second output transistor T10 is electrically connected to the second node N2, a first electrode of the second output transistor T10 is electrically connected to the second power supply line VGL, and a second electrode of the second output transistor T10 is electrically connected to the first output terminal OUT1.

In some examples, as shown in FIG. 6, the first output control circuit 12 may include a first output control transistor T13. A gate of the first output control transistor T13 is electrically connected to the first control terminal CL1, a first electrode of the first output control transistor T13 is electrically connected to the third node N3, and a second electrode of the first output control transistor T13 is electrically connected to the first output terminal OUT1.

In this example, the first node N1 is a connection point for the second electrode of the seventh transistor T7, the second electrode of the eighth transistor T8, the first electrode plate of the first capacitor C1, and the gate of the first output transistor T9. The second node N2 is a connection point for the second electrode of the first transistor T1, the gate of the second transistor T2, the second electrode of the fourth transistor T4, the gate of the eighth transistor T8, the first electrode plate of the third capacitor C3, and the gate of the second output transistor T10. The third node N3 is a connection point for the second electrode of the first output transistor T9, and the first electrode of the first output control transistor T13. The fifth node N5 is a connection point for the second electrode of the second transistor T2, the second electrode of the third transistor T3, the gate of the fifth transistor T5, the gate of the sixth transistor T6, and the first electrode plate of the second capacitor C2. The eighth node N8 is a connection point for the second electrode of the sixth transistor T6, the first electrode of the seventh transistor T7, and the second electrode plate of the second capacitor C2. The ninth node N9 is a connection point for the first electrode of the fourth transistor T4, and the second electrode of the fifth transistor T5.

In some examples, the types of the first transistor T1 to the eighth transistor T8, the first output transistor T9, the second output transistor T10, and the first output control transistor T13 may be the same, for example, they are all P-type transistors. However, this embodiment is not limited thereto.

In some examples, the first power supply line VGH may be continuously provide a first power supply signal with a high potential, and the second power supply line VGL may continuously provide a second power supply signal with a low potential.

Figure 7:
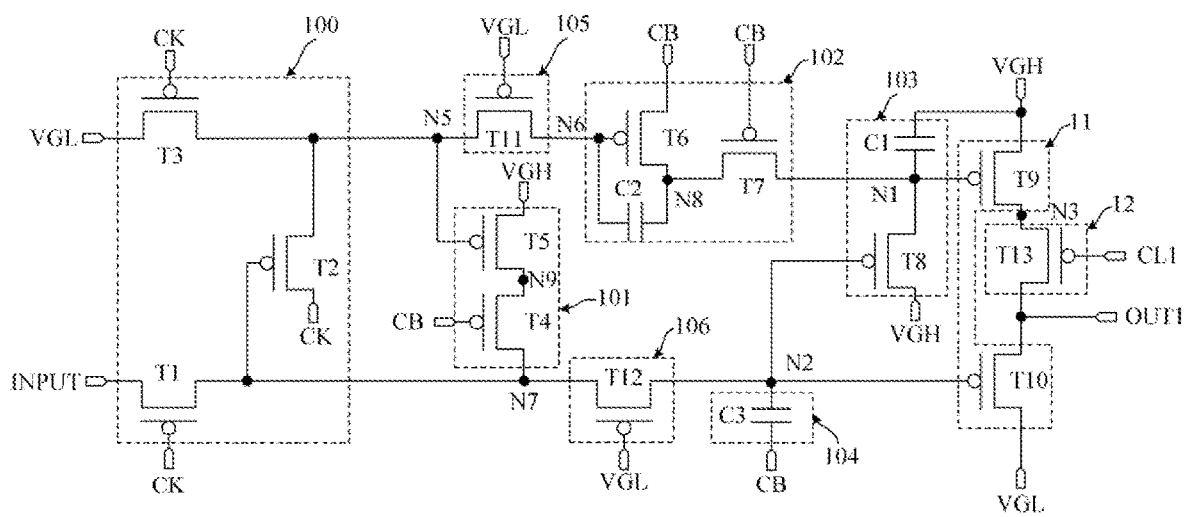
FIG. 7 is another equivalent circuit diagram of a drive control circuit according to at least one embodiment of the present disclosure.

FIG. 7 is another equivalent circuit diagram of a drive control circuit according to at least one embodiment of the present disclosure. In some examples, as shown in FIG. 7, the input circuit of the drive control circuit of the present example may include an input sub-circuit 100, a first control sub-circuit 101, a second control sub-circuit 102, a third control sub-circuit 103, a fourth control sub-circuit 104, a first voltage stabilizing sub-circuit 105, and a second voltage stabilizing sub-circuit 106. The first voltage stabilizing sub-circuit 105 may include a first voltage stabilizing transistor T11. A gate of the first voltage stabilizing transistor T11 is electrically connected to the second power supply line VGL, a first electrode of the first voltage stabilizing transistor T11 is electrically connected to the fifth node N5, and a second electrode of the first voltage stabilizing transistor T11 is electrically connected to the sixth node N6. By providing the first voltage stabilizing sub-circuit 105, a potential of the sixth node N6 may be guaranteed to be stable. The second voltage stabilizing sub-circuit 106 may include a second voltage stabilizing transistor T12. A gate of the second voltage stabilizing transistor T12 is electrically connected to the second power supply line VGL, a first electrode of the second voltage stabilizing transistor T12 is electrically connected to the seventh node N7, and a second electrode of the second voltage stabilizing transistor T12 is electrically connected to the second node N2. By providing the second voltage stabilizing sub-circuit 106, a potential of the second node N2 may be guaranteed to be stable.

In this example, the first node N1 is a connection point for the second electrode of the seventh transistor T7, the second electrode of the eighth transistor T8, the first electrode plate of the first capacitor C1, and the gate of the first output transistor T9. The second node N2 is a connection point for the gate of the eighth transistor T8, the first electrode plate of the third capacitor C3, the gate of the second output transistor T10, and the second electrode of the second voltage stabilizing transistor T12. The third node N3 is a connection point for the second electrode of the first output transistor T9, and the first electrode of the first output control transistor T13. The fifth node N5 is a connection point for the second electrode of the second transistor T2, the second electrode of the third transistor T3, the gate of the fifth transistor T5, and the first electrode of the first voltage stabilizing transistor T11. The sixth node N6 may be a connection point for the gate of the sixth transistor T6, the first electrode plate of the second capacitor C2, and the second electrode of the first voltage stabilizing transistor T11. The seventh node N7 is a connection point for the second electrode of the first transistor T1, the gate of the second transistor T2, the second electrode of the fourth transistor T4, and the first electrode of the second voltage stabilizing transistor T12. The eighth node N8 is a connection point for the second electrode of the sixth transistor T6, the first electrode of the seventh transistor T7, and the second electrode plate of the second capacitor C2. The ninth node N9 is a connection point for the first electrode of the fourth transistor T4, and the second electrode of the fifth transistor T5. A rest of the structure of the drive control circuit according to the present embodiment may be referred to descriptions of the aforementioned embodiments, and thus will not be repeated here.

The drive control circuits provided in FIG. 6 and FIG. 7 may be configured to provide a second scan signal or a first reset control signal to the pixel circuit through the first output terminal. FIG. 6 and FIG. 7 illustrate exemplary structures of an input circuit, a first output circuit and a first output control circuit. Those skilled in the art may easily understand that implementations of the input circuit, the first output circuit, the first output control circuit are not limited thereto as long as its functions can be achieved.

Figure 8:
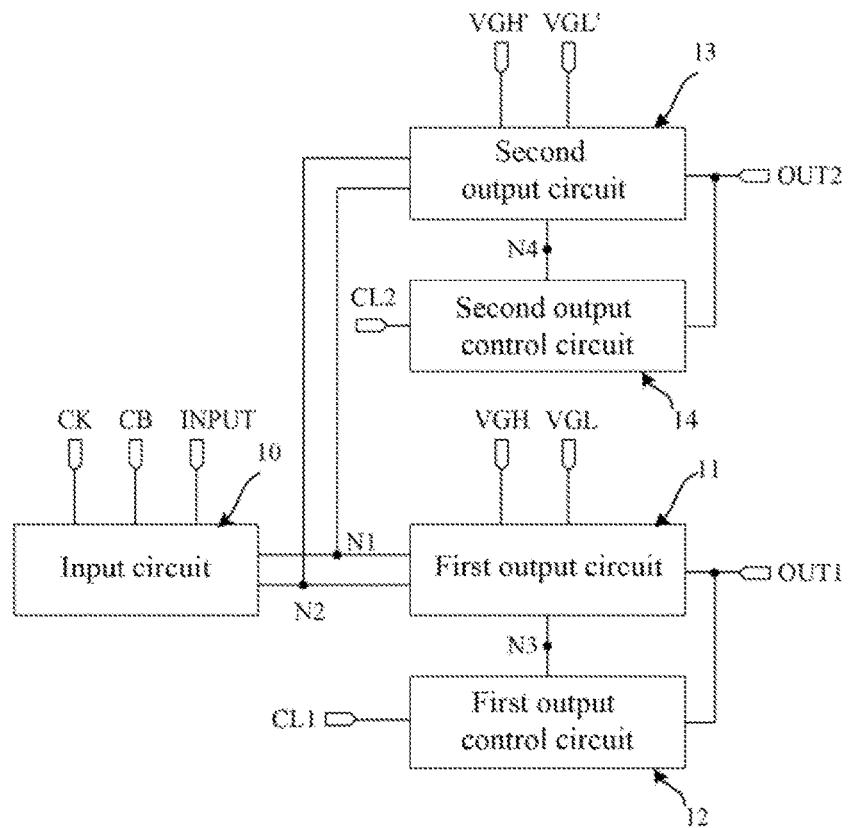
FIG. 8 is another schematic diagram of a drive control circuit according to at least one embodiment of the present disclosure.

FIG. 8 is another schematic diagram of a drive control circuit according to at least one embodiment of the present disclosure. In some examples, as shown in FIG. 8, the drive control circuit of the present example may include an input circuit 10, a first output circuit 11, a first output control circuit 12, a second output circuit 13, and a second output control circuit 14. Herein, the second output circuit 13 may be electrically connected to the first node N1, the second node N2, the fourth node N4 and the second output terminal OUT2, and is configured to provide a third power supply signal transmitted by the third power supply line VGH' to the fourth node N4 under the control of the first node N1, or to provide a fourth power supply signal transmitted by the fourth power supply line VGL' to the second output terminal OUT2 under the control of the second node N4. The second output control circuit 14 may be electrically connected to the fourth node N4, the second control terminal CL2, and the second output terminal OUT2, and is configured to turn on or turn off the fourth node N4 and the second output terminal OUT2 under the control of the second control terminal CL2.

In some examples, the first power supply line VGH and the third power supply line VGH' may be the same power supply line, and the first power supply signal and the third power supply signal may be a same signal. Alternatively, the first power supply line VGH and the third power supply line VGH' may be different power supply lines, and the first power supply signal and the third power supply signal may be a same signal. Alternatively, the first power supply line VGH and the third power supply line VGH' may be different power supply lines, and the first power supply signal and the third power supply signal may different signals. However, this embodiment is not limited thereto.

In some examples, the second power supply line VGL and the fourth power supply line VGL' may be the same power supply line, and the second power supply signal and the fourth power supply signal may be a same signal. Alternatively, the second power supply line VGL and the fourth power supply line VGL' may be different power supply lines, and the second power supply signal and the fourth power supply signal may be a same signal. Alternatively, the second power supply line VGL and the fourth power supply line VGL' may be two different power supply lines, and the second power supply signal and the fourth power supply signal may be different signals. However, this embodiment is not limited thereto.

In some examples, the output signal of the first output terminal OUT1 and the output signal of the second output terminal OUT2 may be the same, i.e. the phases of both may be the same, and the effective levels of both may also be the same. For example, the output signal of the first output terminal OUT1 may be provided as a second scan signal to one row of pixel circuits in the display region, and the output signal of the second output terminal OUT2 may be provided as a first reset control signal to another row of pixel circuits in the display region. However, this embodiment is not limited thereto.

The drive control circuit provided by the present example may provide two kinds of signals (i.e., a second scan signal and a first reset control signal) to the pixel circuit, and the output signal provided by the drive control circuit may meet the requirements of the pixel circuit in the first operation mode and the second operation mode.

Figure 9:
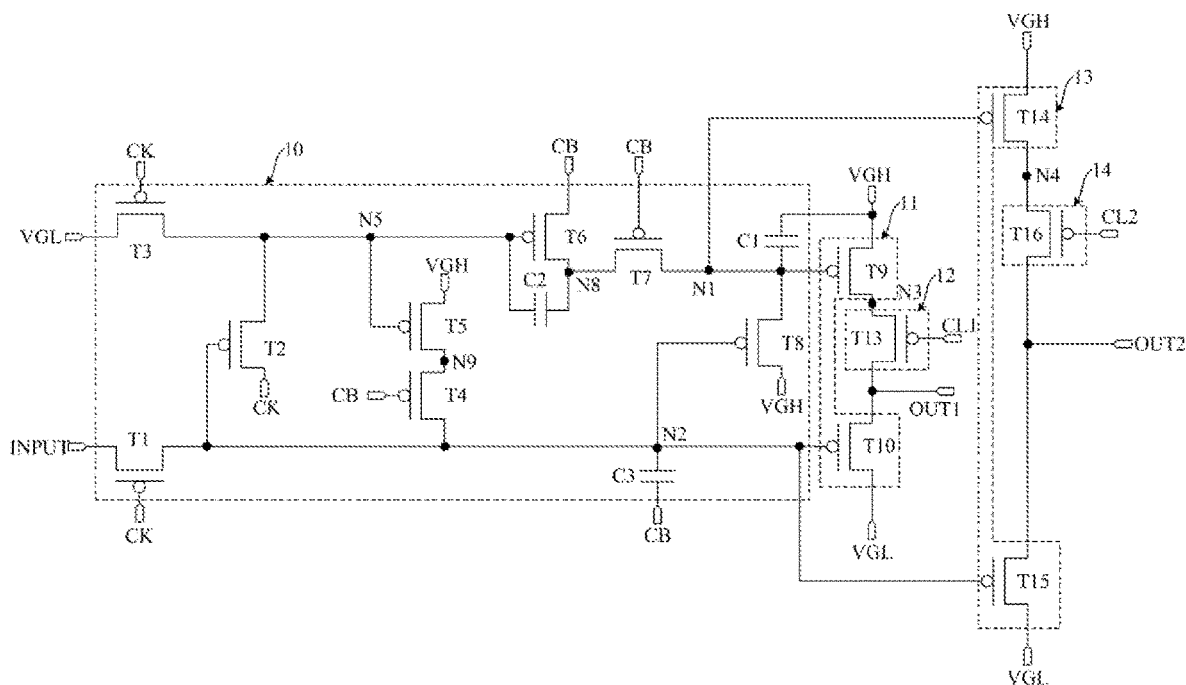
FIG. 9 is an equivalent circuit diagram of a drive control circuit according to at least one embodiment of the present disclosure.

FIG. 9 is an equivalent circuit diagram of a drive control circuit according to at least one embodiment of the present disclosure. In this example, the first power supply line and the third power supply line are a same power supply line, and the second power supply line and the fourth power supply line are a same power supply line. As shown in FIG. 9, the second output circuit 13 may include a third output transistor T14 and a fourth output transistor T15. A gate of the third output transistor T14 is electrically connected to the first node N1, a first electrode of the third output transistor T14 is electrically connected to the first power supply line VGH, and a second electrode of the third output transistor T14 is electrically connected to the fourth node N4. A gate of the fourth output transistor T15 is electrically connected to the second node N2, a first electrode of the fourth output transistor T15 is electrically connected to the second power supply line VGL, and a second electrode of the fourth output transistor T15 is electrically connected to the second output terminal OUT2. The second output control circuit 14 may include a second output control transistor T16. A gate of the second output control transistor T16 is electrically connected to the second control terminal CL2, a first electrode of the second output control transistor T16 is electrically connected to the fourth node N4, and a second electrode of the second output control transistor T16 is electrically connected to the second output terminal OUT2.

In this example, the first node N1 is a connection point for the second electrode of the seventh transistor T7, the second electrode of the eighth transistor T8, the first electrode plate of the first capacitor C1, the gate of the first output transistor T9, and the gate of the third output transistor T14. The second node N2 is a connection point for the second electrode of the second voltage stabilizing transistor T12, the first electrode plate of the third capacitor C3, the gate of the eighth transistor T8, the gate of the second output transistor T10, and the gate of the fourth output transistor T15. The third node N3 is a connection point for the second electrode of the first output transistor T9, and the first electrode of the first output control transistor T13. The fourth node N4 is a connection point for the second electrode of the third output transistor T14, and the first electrode of the second output control transistor T16.

The structures of the input circuit 10, the first output circuit 11 and the first output control circuit 12 of the present example may be described with reference to the embodiment shown in FIG. 6, and therefore will not be repeated here.

Figure 10:
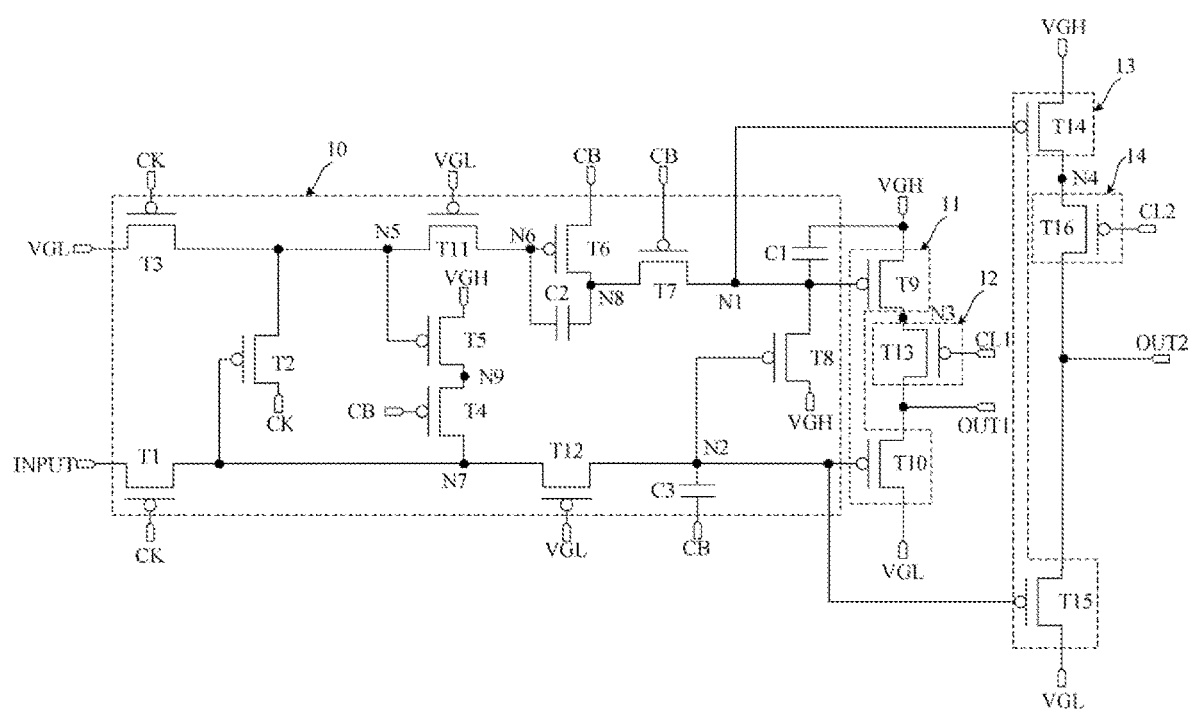
FIG. 10 is another equivalent circuit diagram of a drive control circuit according to at least one embodiment of the present disclosure.

FIG. 10 is another equivalent circuit diagram of a drive control circuit according to at least one embodiment of the present disclosure. In this example, the first power supply line and the third power supply line are a same power supply line, and the second power supply line and the fourth power supply line are a same power supply line. As shown in FIG. 10, the input circuit 10 may include a first transistor T1 to an eighth transistor T8, a first capacitor C1 to a third capacitor C3, a first voltage stabilizing transistor T11 and a second voltage stabilizing transistor T12. The structures of the input circuit 10, the first output circuit 11, and the first output control circuit 12 of the present example may refer to the description of the embodiment shown in FIG. 7, the structures of the second output circuit 13 and the second output control circuit 14 of the present example may refer to the description of the embodiment shown in FIG. 9, and thus will not be repeated here.

In some examples, the drive control circuit may have a first drive mode and a second drive mode. An output signal provided by the drive control circuit in the first drive mode may cause the pixel circuit to be in the first operation mode, and an output signal provided by the drive control circuit in the second drive mode may cause the pixel circuit to be in the second operation mode.

Figure 11:
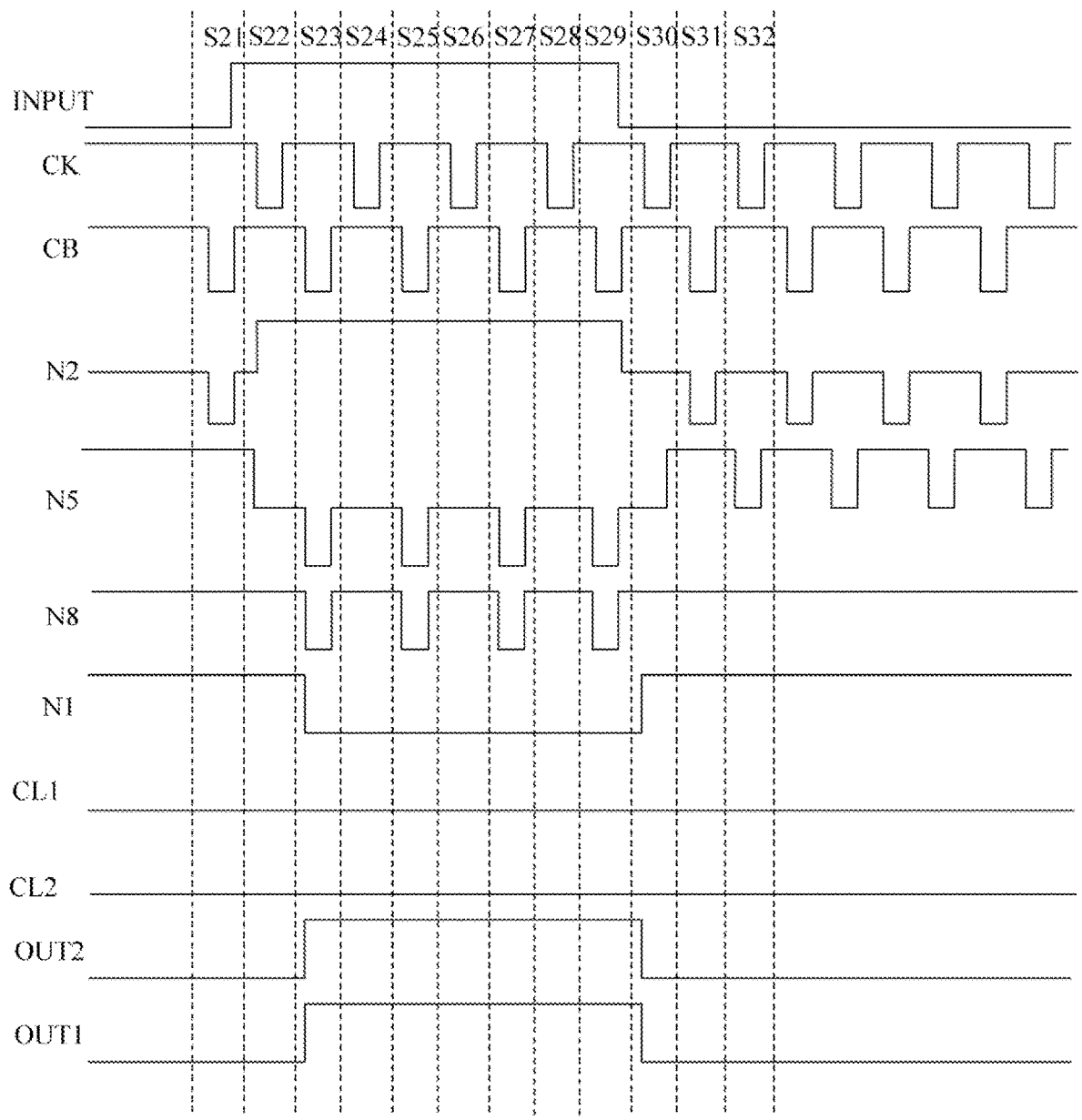
FIG. 11 is a working sequence diagram of a drive control circuit according to at least one embodiment of the present disclosure in a first drive mode.
Figure 12:
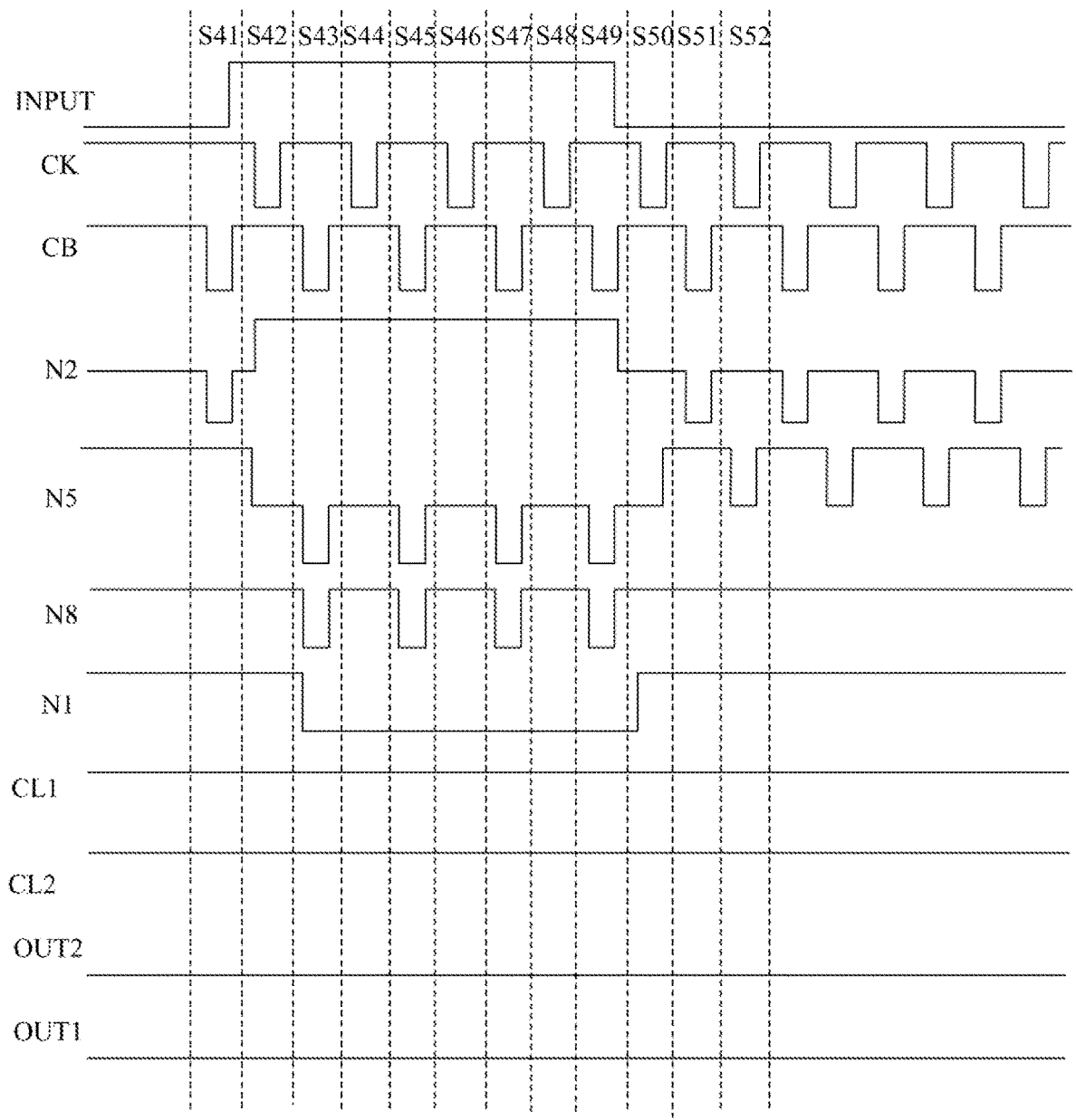
FIG. 12 is a working sequence diagram of a drive control circuit according to at least one embodiment of the present disclosure in a second drive mode.

FIG. 11 is a working sequence diagram of a drive control circuit according to at least one embodiment of the present disclosure in a first drive mode. FIG. 12 is a working sequence diagram of a drive control circuit according to at least one embodiment of the present disclosure in a second drive mode. The operation process of the drive control circuit shown in FIG. 10 will be described with reference to FIG. 11 and FIG. 12 by taking the operation process of the first stage drive control circuit as an example. A signal input terminal INPUT of the first stage drive control circuit may be electrically connected with the start signal line STV. As shown in FIG. 10, the drive control circuit of the present example may include 16 transistor units (i.e. a first transistor T1 to an eighth transistor T8, a first output transistor T9, a second output transistor T10, a first voltage stabilizing transistor T11, a second voltage stabilizing transistor T12, a third output transistor T14, a fourth output transistor T15, a first output control transistor T13, and a second output control transistor T16), 3 capacitor units (i.e. a first capacitor C1 to a third capacitor C3), 5 INPUT terminals (i.e. a first clock terminal CK, a second clock terminal CB, a signal INPUT terminal INPUT, a first control terminal CL1, and a second control terminal CL2), 2 output terminals (i.e. a first output terminal OUT1 and a second output terminal OUT2), and 2 power supply terminals (i.e. a first power supply line VGH and a second power supply line VGL). Herein, the first power supply line VGH may be continuously provide a high-level first power supply signal, and the second power supply line VGL may continuously provide a low-level second power supply signal. For example, the absolute values of the voltages of the effective levels of the first power supply signal and the second power supply signal may be substantially the same. However, this embodiment is not limited thereto.

It is illustrated below by taking a working process of the drive control circuit in the first drive mode as an example. As shown in FIG. 10, the second power supply line VGL continuously provides a signal with a low potential, and both the first voltage stabilizing transistor T11 and the second voltage stabilizing transistor T12 are turned on. The first voltage stabilizing transistor T11 is turned on, so that the fifth node N5 and the sixth node N6 are communicated, and the potentials of the fifth node N5 and the sixth node N6 are the same. The second voltage stabilizing transistor T12 is turned on, so that the seventh node N7 and the second node N2 are communicated, and the potentials of the seventh node N7 and the second node N2 are the same. As shown in FIG. 11, in the first drive mode, low-level signals are continuously input into the first control terminal CL1, and the first output control transistor T13 keeps a turned-on state; and low-level signals are continuously input into the second control terminal CL2, and the second output control transistor T16 keeps a turned-on state.

In some examples, as shown in FIG. 11, the working process of the drive control circuit in the first drive mode may include the following stages:

In a first stage 521, a low-level signal is input into the signal input terminal INPUT, a high-level signal is input into the first clock terminal CK, and a low-level signal is input into the second clock terminal CB. A high-level signal is input into the first clock terminal CK, so that the first transistor T1 and the third transistor T3 are turned off. A signal with a low potential is input into the second clock terminal CB, so that the fourth transistor T4 and the seventh transistor T7 are turned on. Since a low-level signal is input into the second clock terminal CB, the second node N2 will be further pulled down under the action of the third capacitor C3 on a basis of a low potential of the previous stage. The second node N2 is at a low potential, so that the second transistor T2, the eighth transistor T8, the second output transistor T10 and the fourth output transistor T15 are turned on. The second transistor T2 is turned on, and the high-level signal input into the first clock terminal CK is transmitted to the fifth node N5, which is at a high potential, so that the fifth transistor T5 and the sixth transistor T6 are turned off. The eighth transistor T8 is turned on, so that the first node N1 is at a high potential, and the first output transistor T9 and the third output transistor T14 are turned off. The first output transistor T9 is turned off, the first output control transistor T13 is turned on, the second output transistor T10 is turned on, and the first output terminal OUT1 outputs a low-level signal provided by the second power supply line VGL. The third output transistor T14 is turned off, the second output control transistor T16 is turned on, the fourth output transistor T15 is turned on, and the second output terminal OUT2 outputs a low-level signal provided by the second power supply line VGL.

In a second stage S22, a high-level signal is input into the signal input terminal INPUT, a low-level signal is input into the first clock terminal CK, and a high-level signal is input into the second clock terminal CB. The first transistor T1 and the third transistor T3 are turned on, and the fourth transistor T4 and the seventh transistor T7 are turned off. A high-level signal provided by the signal input terminal INPUT may be transmitted to the second node N2 through the first transistor T1 and the twelfth transistor T12 which are turned on, so that a potential of the second node N2 is pulled high. The second node N2 is at a high potential, so that the second transistor T2, the eighth transistor T8, the second output transistor T10 and the fourth output transistor T15 are turned off. The turned-on third transistor T3 may transmit a low-level signal provided by the second power supply line VGL to the fifth node N5. The fifth node N5 is at a low potential, and the fifth transistor T5 and the sixth transistor T6 are turned on. The sixth transistor T6 is turned on, and the second clock terminal CB inputs a high-level signal, so that the eighth node N8 is at a high potential. Since both the seventh transistor T7 and the eighth transistor T8 are turned off, the first node N1 may keep a high potential under the action of the first capacitor C1, so that the first output transistor T9 and the third output transistor T14 are turned off. Since both the first output transistor T9 and the second output transistor T10 are turned off, the first output terminal OUT1 may keep the previous low-level output. Since both the third output transistor T14 and the fourth output transistor T15 are turned off, the second output terminal OUT2 may keep the previous low-level output.

In a third stage S23, a high-level signal is input into the signal input terminal INPUT, a high-level signal is input into the first clock terminal CK, and a low-level signal is input into the second clock terminal CB. The first transistor T1 and the third transistor T3 are turned off, and the fourth transistor T4 and the seventh transistor T7 are turned on. The second node N2 keeps the high potential of the previous stage, so that the second transistor T2, the eighth transistor T8, the second output transistor T10 and the fourth output transistor T15 are turned off. The fifth node N5 keeps the low potential of the previous stage, so that the fifth transistor T5 and the sixth transistor T6 are turned on. The sixth transistor T6 is turned on, and a low-level signal is input into the second clock terminal CB, which pulls the eighth node N8 to a low potential, and further lowers the potential of the fifth node N5 under the action of the second capacitor C2. The seventh transistor T7 is turned on, and the eighth node N8 and the first node N1 are communicated, which lowers the potential of the first node N1, so that the first output transistor T9 and the third output transistor T14 are turned on. The fourth transistor T4 and the fifth transistor T5 are turned on, which may ensure that the second node N2 is at a high potential. The first output transistor T9 and the first output control transistor T13 are both turned on, the second output transistor T10 is turned off, and the first output terminal OUT1 outputs a high-level signal provided by the first power supply line VGH. The third output transistor T14 and the second output control transistor T16 are both turned on, the fourth output transistor T15 is turned off, and the second output terminal OUT2 outputs a high-level signal provided by the first power supply line VGH.

In a fourth stage S24, a high-level signal is input into the signal input terminal INPUT, a low-level signal is input into the first clock terminal CK, and a high-level signal is input into the second clock terminal CB. The first transistor T1 and the third transistor T3 are turned on, and the fourth transistor T4 and the seventh transistor T7 are turned off. The second node N2 keeps the high potential of the previous stage, so that the second transistor T2, the eighth transistor T8, the second output transistor T10 and the fourth output transistor T15 are turned off. The fifth node N5 is at a low potential, so that the fifth transistor T5 and the sixth transistor T6 are turned on. Both the seventh transistor T7 and the eighth transistor T8 are turned off, and the first node N1 keeps the low potential of the previous stage under the action of the first capacitor C1, so that both the first output transistor T9 and the third output transistor T14 are turned on. The first output transistor T9 and the first output control transistor T13 are both turned on, the second output transistor T10 is turned off, and the first output terminal OUT1 outputs a high-level signal provided by the first power supply line VGH. The third output transistor T14 and the second output control transistor T16 are both turned on, the fourth output transistor T15 is turned off, and the second output terminal OUT2 outputs a high-level signal provided by the first power supply line VGH.

In a fifth stage S25, a high-level signal is input into the signal input terminal INPUT, a high-level signal is input into the first clock terminal CK, and a low-level signal is input into the second clock terminal CB. The first transistor T1 and the third transistor T3 are turned off, and the fourth transistor T4 and the seventh transistor T7 are turned on. The second node N2 keeps the high potential of the previous stage, so that the second transistor T2, the eighth transistor T8, the second output transistor T10 and the fourth output transistor T15 are all turned off. The fifth node N5 is further lowered under the action of the second capacitor C2, the eighth node N8 is at a low potential, and the first node N1 is at a low potential, so that both the first output transistor T9 and the third output transistor T14 are turned on. The first output transistor T9 and the first output control transistor T13 are both turned on, the second output transistor T10 is turned off, and the first output terminal OUT1 outputs a high-level signal provided by the first power supply line VGH. The third output transistor T14 and the second output control transistor T16 are both turned on, the fourth output transistor T15 is turned off, and the second output terminal OUT2 outputs a high-level signal provided by the first power supply line VGH.

In a sixth stage S26, a high-level signal is input into the signal input terminal INPUT, a low-level signal is input into the first clock terminal CK, and a high-level signal is input into the second clock terminal CB. The first transistor T1 and the third transistor T3 are turned on, and the fourth transistor T4 and the seventh transistor T7 are turned off. The second node N2 keeps the high potential of the previous stage, so that the second transistor T2, the eighth transistor T8, the second output transistor T10 and the fourth output transistor T15 are all turned off. The fifth node N5 is at a low potential, and both the fifth transistor T5 and the sixth transistor T6 are turned on. Both the seventh transistor T7 and the eighth transistor T8 are turned off, and the first node N1 keeps the low potential of the previous stage under the action of the first capacitor C1, so that both the first output transistor T9 and the third output transistor T14 are turned on. The first output transistor T9 and the first output control transistor T13 are both turned on, the second output transistor T10 is turned off, and the first output terminal OUT1 outputs a high-level signal provided by the first power supply line VGH. The third output transistor T14 and the second output control transistor T16 are both turned on, the fourth output transistor T15 is turned off, and the second output terminal OUT2 outputs a high-level signal provided by the first power supply line VGH.

In a seventh stage S27, a high-level signal is input into the signal input terminal INPUT, a high-level signal is input into the first clock terminal CK, and a low-level signal is input into the second clock terminal CB. In this stage, the first output transistor T9 and the first output control transistor T13 are both turned on, the second output transistor T10 is turned off, and the first output terminal OUT1 outputs a high-level signal provided by the first power supply line VGH. The third output transistor T14 and the second output control transistor T16 are both turned on, the fourth output transistor T15 is turned off, and the second output terminal OUT2 outputs a high-level signal provided by the first power supply line VGH. The process of this stage may be referred to the description of the fifth stage S25, and thus will not be repeated here.

In an eighth stage S28, a high-level signal is input into the signal input terminal INPUT, a low-level signal is input into the first clock terminal CK, and a high-level signal is input into the second clock terminal CB. In this stage, the first output transistor T9 and the first output control transistor T13 are both turned on, the second output transistor T10 is turned off, and the first output terminal OUT1 outputs a high-level signal provided by the first power supply line VGH. The third output transistor T14 and the second output control transistor T16 are both turned on, the fourth output transistor T15 is turned off, and the second output terminal OUT2 outputs a high-level signal provided by the first power supply line VGH. The process of this stage may be referred to the description of the sixth stage S26, and thus will not be repeated here.

In a ninth stage S29, a high-level signal is input into the signal input terminal INPUT, a high-level signal is input into the first clock terminal CK, and a low-level signal is input into the second clock terminal CB. In this stage, the first output transistor T9 and the first output control transistor T13 are both turned on, the second output transistor T10 is turned off, and the first output terminal OUT1 outputs a high-level signal provided by the first power supply line VGH. The third output transistor T14 and the second output control transistor T16 are both turned on, the fourth output transistor T15 is turned off, and the second output terminal OUT2 outputs a high-level signal provided by the first power supply line VGH. The process of this stage may be referred to the description of the fifth stage S25, and thus will not be repeated here.

In a tenth stage S30, a low-level signal is input into the signal input terminal INPUT, a low-level signal is input into the first clock terminal CK, and a high-level signal is input into the second clock terminal CB. The first transistor T1 and the third transistor T3 are turned on, and the fourth transistor T4 and the seventh transistor T7 are turned off. The low-level signal of the signal input terminal INPUT may lower the potential of the second node N2 through the first transistor T1 and the second voltage stabilizing transistor T12 which are turned on, so that the second transistor T2, the eighth transistor T8, the second output transistor T10 and the fourth output transistor T15 are all turned on. The low-level signal of the first clock terminal CK may be transmitted to the fifth node N5 through the turned-on second transistor T2, and the low-level signal of the second power supply line VGL may be transmitted to the fifth node N5 through the turned-on third transistor T3. The fifth node N5 is at a low potential, so that the fifth transistor T5 and the sixth transistor T6 are turned on, and the eighth node N8 is at a high potential. The high-level signal of the first power supply line VGH is transmitted to the first node N1 through the turned-on eighth transistor T8, and the potential of the first node N1 is pulled up, so that the first output transistor T9 and the third output transistor T14 are turned off. In this stage, the first output transistor T9 is turned off, the second output transistor T10 is turned on, and the first output terminal OUT1 outputs a low-level signal provided by the second power supply line VGL. The third output transistor T14 is turned off, the fourth output transistor T15 is turned on, and the second output terminal OUT2 outputs a low-level signal provided by the second power supply line VGL.

In an eleventh stage S31, a low-level signal is input into the signal input terminal INPUT, a high-level signal is input into the first clock terminal CK, and a low-level signal is input into the second clock terminal CB. The first transistor T1 and the third transistor T3 are turned off, and the fourth transistor T4 and the seventh transistor T7 are turned on. The second node N2 keeps a low potential, and is further lowered under the action of the third capacitor C3 when a low level is input into the second clock terminal CB, so that the second transistor T2, the eighth transistor T8, the second output transistor T10, and the fourth output transistor T15 are all turned on. The high-level signal of the first clock terminal CK may be transmitted to the third node N5 through the turned-on second transistor T2 to pull up the fifth node N5, so that the fifth transistor T5 and the sixth transistor T6 are turned off. The eighth transistor T8 is turned on, so that the first node N1 keeps a high potential, and the first output transistor T9 and the third output transistor T14 are turned off. In this stage, the first output transistor T9 is turned off, the second output transistor T10 is turned on, and the first output terminal OUT1 outputs a low-level signal provided by the second power supply line VGL. The third output transistor T14 is turned off, the fourth output transistor T15 is turned on, and the second output terminal OUT2 outputs a low-level signal provided by the second power supply line VGL.

In a twelfth stage S32, a low-level signal is input into the signal input terminal INPUT, a low-level signal is input into the first clock terminal CK, and a high-level signal is input into the second clock terminal CB. The first transistor T1 and the third transistor T3 are turned on, and the fourth transistor T4 and the seventh transistor T7 are turned off. The low-level signal of the signal input terminal INPUT may lower the potential of the second node N2 through the first transistor T1 and the second voltage stabilizing transistor T12 which are turned on, so that the second transistor T2, the eighth transistor T8, the second output transistor T10 and the fourth output transistor T15 are turned on. The low-level signal of the first clock terminal CK may be transmitted to the fifth node N5 through the turned-on second transistor T2, and the low-level signal of the second power supply line VGL may be transmitted to the fifth node N5 through the turned-on third transistor T3. The fifth node N5 is at a low potential, so that the fifth transistor T5 and the sixth transistor T6 are turned on, and the eighth node N8 is at a high potential. The eighth transistor T8 is turned on, so that the first node N1 keeps a high potential, and the first output transistor T9 and the third output transistor T14 are turned off. In this stage, the first output transistor T9 is turned off, the second output transistor T10 is turned on, and the first output terminal OUT1 outputs a low-level signal provided by the second power supply line VGL. The third output transistor T14 is turned off, the fourth output transistor T15 is turned on, and the second output terminal OUT2 outputs a low-level signal provided by the second power supply line VGL.

After the twelfth stage S32, the eleventh stage S31 and the twelfth stage S32 may be repeated until a high-level signal is input to the signal input terminal INPUT, and then restart from the second stage S22.

According to the working process of the drive control circuit, in the third stage S23 to the ninth stage S29, both the first output terminal OUT1 and the second output terminal OUT2 output high-level signals, and in other stages, both the first output terminal OUT1 and the second output terminal OUT2 output low-level signals. In some examples, the output signal of the first output terminal of the drive control circuit in the first drive mode may be provided as a second scan signal to a row of pixel circuits, such that the row of pixel circuits is in the first operation mode. The output signal of the second output terminal may be provided as a first reset control signal to another row of pixel circuits, such that this another row of pixel circuits is in a first operation mode.

In some examples, as shown in FIG. 12, the working process of the drive control circuit in the second drive mode may include a first stage S41 to a twelfth stage S52. In the second drive mode, high-level signals are continuously input into the first control terminal CL1, and the first output control transistor T13 keeps a turned-off state; and high-level signals is continuously input into the second control terminal CL2, and the second output control transistor T16 keeps a turned-off state. The first output terminal OUT1 continuously outputs low-level signals, and the second output terminal OUT2 continuously outputs low-level signals. The output signal of the first output terminal of the drive control circuit in the second drive mode may be provided as a second scan signal to a row of pixel circuits, so that the row of pixel circuits is in the second operation mode, and the output signal of the second output terminal may be provided as a first reset control signal to another row of pixel circuits, so that this another row of pixel circuits is in the second operation mode. The remaining descriptions of the first stage S41 and the twelfth stage S52 may refer to the description of the aforementioned embodiments, and thus will not be repeated here.

Figure 13:
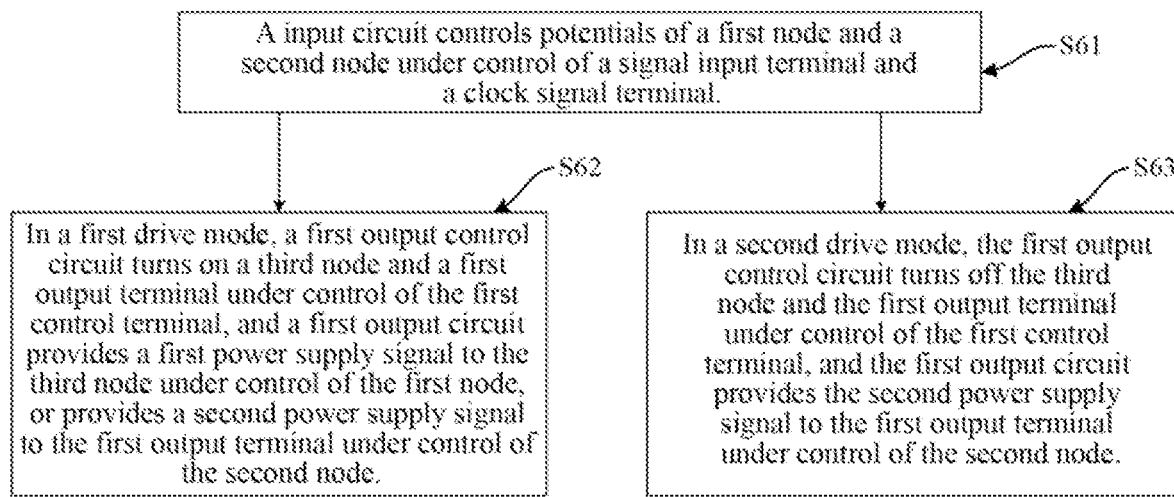
FIG. 13 is a schematic diagram of a drive method of a drive control circuit according to at least one embodiment of the present disclosure.

The present embodiment further provides a drive method of the drive control circuit, which is applied to the drive control circuit as described in the above embodiment. FIG. 13 is a schematic diagram of a drive method of a drive control circuit according to at least one embodiment of the present disclosure. In some examples, as shown in FIG. 13, the drive method of this example may include following steps.

At step S61, the input circuit controls the potentials of the first node and the second node under the control of the signal input terminal and the clock signal terminal;

At step S62, in the first drive mode, the first output control circuit turns on the third node and the first output terminal under the control of the first control terminal, and the first output circuit provides the first power supply signal to the third node under the control of the first node, or provides the second power supply signal to the first output terminal under the control of the second node;

At step S63, in the second drive mode, the first output control circuit turns off the third node and the first output terminal under the control of the first control terminal, and the first output circuit provides the second power supply signal to the first output terminal under the control of the second node.

The drive method of the drive control circuit in the embodiment may refer to the descriptions in the above-mentioned embodiments, and thus will not be repeated here.

Figure 14:
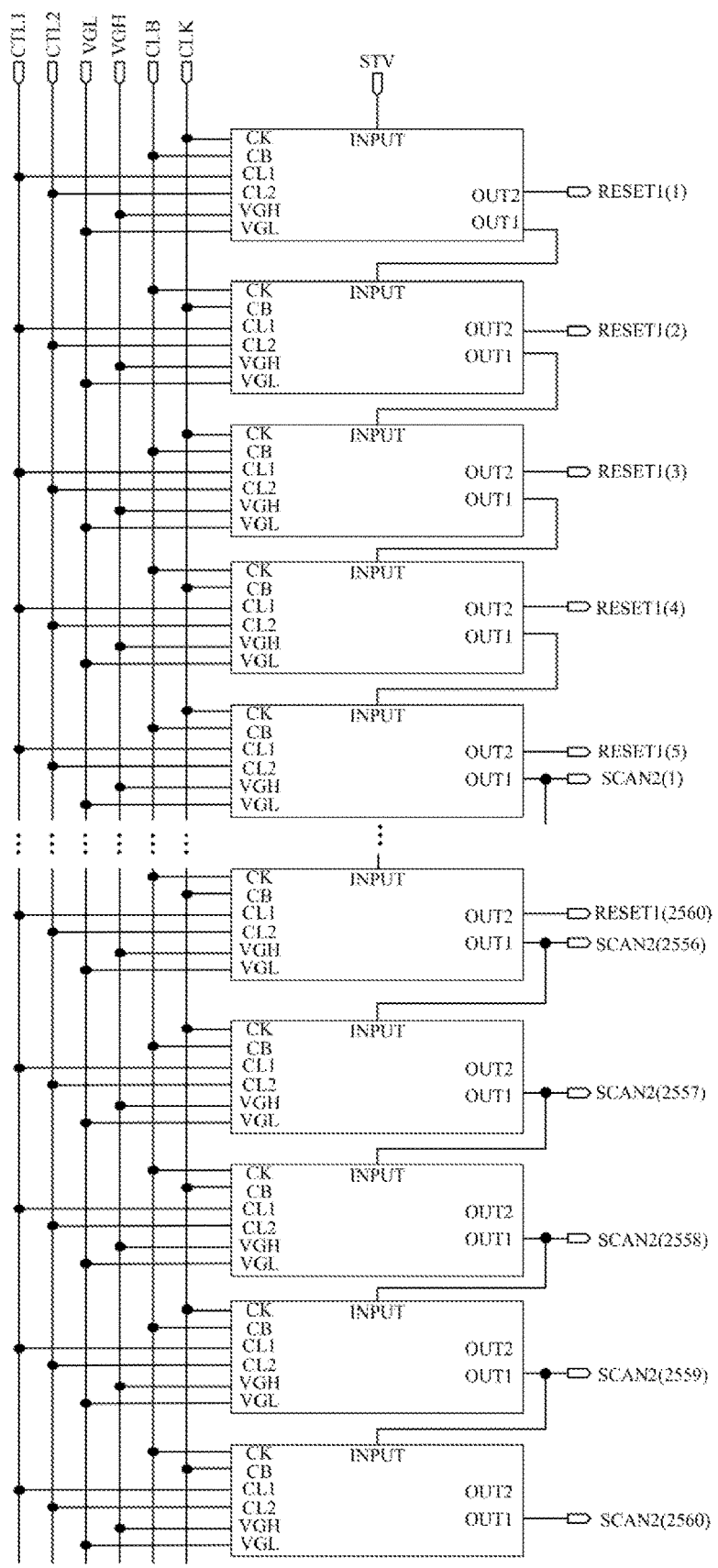
FIG. 14 is a schematic diagram of a gate drive circuit according to at least one embodiment of the present disclosure.

FIG. 14 is a schematic diagram of a gate drive circuit according to at least one embodiment of the present disclosure. In some examples, as shown in FIG. 14, the gate drive circuit provided by the present example may include a plurality of cascaded drive control circuits. A structure of a single drive control circuit may be as described in the foregoing embodiment, and its realization principle and realization effect are similar, so it will not be described here.

In some examples, as shown in FIG. 14, the signal input terminal of the first stage drive control circuit may be electrically connected to the start signal line STV. A signal input terminal of an (i+1)-th stage drive control circuit is electrically connected with a first output terminal OUT1 of an i-th stage drive control circuit. Herein, i is an integer greater than 0.

In some examples, as shown in FIG. 14, the first clock terminals CK of a plurality of drive control circuits are electrically connected to the first clock signal line CKL and are configured to receive a first clock signal, and the second clock terminals CB are electrically connected to the second clock signal line CBL and are configured to receive a second clock signal. The first clock signal and the second clock signal may both be pulse signals. For example, duty cycles of the first clock signal and the second clock signal may be substantially the same, and the first clock signal and the second clock signal are not simultaneously low levels. The plurality of drive control circuits are also electrically connected to the second power supply line VGL continuously providing low-level signals and the first power supply line VGH continuously providing high-level signals, respectively. However, this embodiment is not limited thereto.

In some examples, as shown in FIG. 14, a first clock terminal CK of a q-th stage drive control circuit is electrically connected to the first clock signal line CKL, and the second clock terminal CB is electrically connected to the second clock signal line CBL; and a first clock terminal CK of a (q+1)-th stage drive control circuit is electrically connected to the second clock signal line CBL, and the second clock terminal CB is electrically connected to the first clock signal line CKL. Herein, a value of q is 2n or 2n−1, and n is an integer greater than 0. Two cascaded drive control circuits of the gate drive circuit of the example may be used as a repetition unit with a minimum period to drive two rows of sub-pixels of a display region. However, this embodiment is not limited thereto.

In some examples, as shown in FIG. 14, a first control terminal CL1 of the plurality of drive control circuits is electrically connected to a first control line CTL1, and a second control terminal CL2 is electrically connected to a second control line CTL2. The first control line CTL1 is configured to provide a first control signal, and the second control line CTL2 is configured to provide a second control signal. An output timing of a high-level signal of the first output terminal may be controlled through the first control signal, and an output timing of a high-level signal of the second output terminal may be controlled through the second control signal.

In some examples, as shown in FIG. 14, the (j+5)-th stage drive control circuit may be configured to provide the second scan signal to a pixel circuit of a j-th row through the first output terminal, and may also be configured to provide the first reset control signal to a pixel circuit of a (j+5)-th row through the second output terminal. Herein, j is an integer. For example, the fifth stage drive control circuit may be configured to provide the second scan signal to a pixel circuit of a first row through the first output terminal, and may also be configured to provide the first reset control signal to a pixel circuit of a fifth row through the second output terminal. However, this embodiment is not limited thereto.

The present embodiment also provides a display panel including a plurality of pixel circuits and a gate drive circuit as described above. The gate drive circuit may include a plurality of cascaded drive control circuits.

In some examples, the display region may at least include a first sub-display region and a second sub-display region, and a refresh rate of the first sub-display region may be different from a refresh rate of the second sub-display region. For example, the display region may include 2a rows of pixel circuits, the first sub-display region may include pixel circuits of a first row to an a-th row, and the second sub-display region may include pixel circuits of an (a+1)-th row to an 2a-th row, wherein a may be a positive integer greater than 0. The first sub-display region and the second sub-display region may be determined according to a type of display picture of the display panel. The structures of the pixel circuits within the first sub-display region and the second sub-display region may be the same. In this example, the output signal provided by the drive control circuit is used to control the pixel circuit, which may achieve different refresh rates in different sub-display regions of the display panel, and is beneficial to reducing power consumption. In other examples, the display region may include three or more sub-display regions with different refresh rates. This embodiment is not limited thereto.

In some examples, the pixel circuit of the first sub-display region may be configured to be in a first operation mode in one frame under the control of the drive control circuit, and the pixel circuit of the second sub-display region may be configured to be in a second operation mode in the same frame. For example, a plurality of pixel circuits of the display region may be configured to be in a first operation mode in a k-th frame under the control of the drive control circuit, the pixel circuit of the first sub-display region may be configured to be in a first operation mode in a (k+1)-th frame, and the pixel circuit of the second sub-display region may be configured to be in a second operation mode in a (k+1)-th frame, wherein k is an integer greater than 0. For another example, the pixel circuit of the first sub-display region is in the first operation mode, and the pixel circuit of the second sub-display region is in the second operation mode in two consecutive frames after the k-th frame, thereby achieving different refresh rates of different regions of the display region in the same frame, and achieving drive of the mixed refresh rate of the display panel, which may further reduce the refresh rate and save power consumption.

Figure 15:
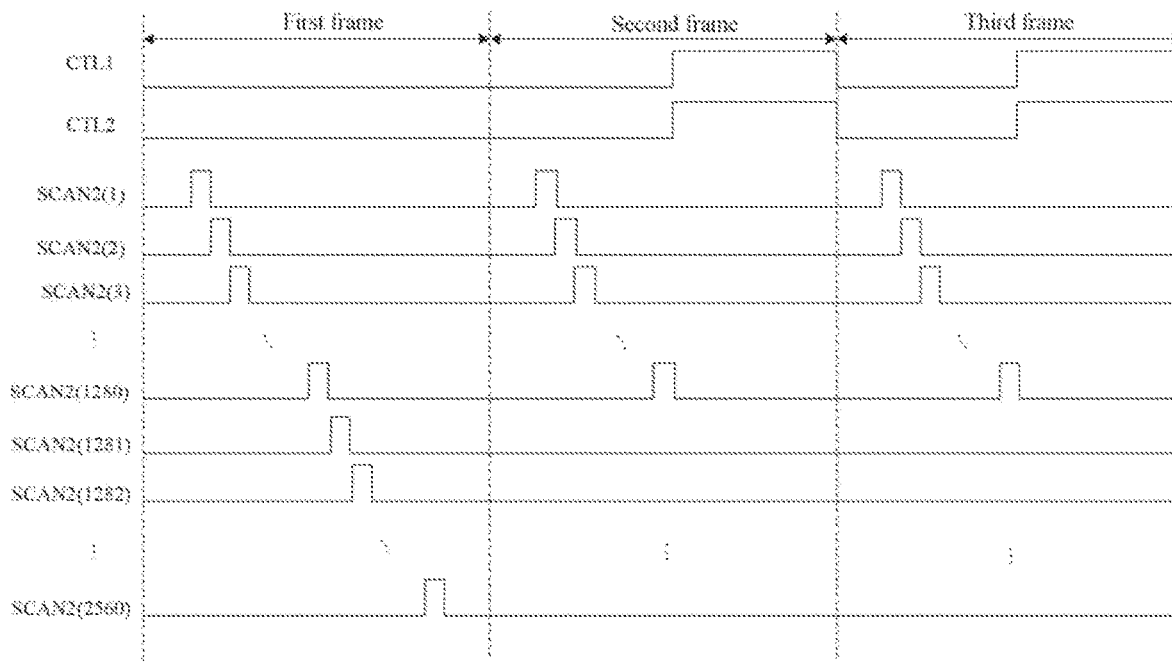
FIG. 15 is a schematic diagram of a timing control of pixel circuits of partial rows of a display panel according to at least one embodiment of the present disclosure.

FIG. 15 is a schematic diagram of a timing control of pixel circuits of partial rows of a display panel according to at least one embodiment of the present disclosure. In some examples, a plurality of pixel circuits arranged along the first direction within the display region may be referred to as a row of pixel circuits. Taking the display panel including 2560 rows of pixel circuits as an example, a timing of the second scan signal received by a plurality of rows of pixel circuits, and timings of the first control signal provided by the first control line CTL1 and the second control signal provided by the second control line CTL2 are schematically illustrated in FIG. 15. As shown in FIG. 15, in a first frame display stage, the first control line CL1 provides a first control signal of a continuous low potential, and the second control line CL2 provides a second control signal with a continuous low potential. The drive control circuits of the gate drive circuit are all in the first drive mode, and these drive control circuits provide the second scan signal and the first reset control signal to the 2560 rows of pixel circuits, so that the 2560 rows of pixel circuits may be in the first operation mode. In a second frame display stage, the first control signal provided by the first control line CL1 first keeps a low potential and then switches to a high potential after a period of time, and the second control signal provided by the second control line CL2 first keeps a low potential and then switches to a high potential after a period of time. In this way, a drive control circuit receiving the first control signal and the second control signal with low potentials may be in the first drive mode, thereby providing the second scan signal to a plurality of rows (e.g., a first row to a 1280th row)

of pixel circuits, so that the first row to the 1280th row of pixel circuits may be in the first operation mode. A drive control circuit receiving the first control signal and the second control signal with high potentials may be in a second drive mode, thereby providing the second scan signal to a plurality of rows (e.g. a 1281th row to a 2560th row) of pixel circuits, so that the pixel circuits of the 1281th row to the 2560th row may be in a second operation mode, and in other words, the pixel circuits of the 1281th row to the 2560th row do not perform processes of a data writing and a threshold compensation. The process of the third frame display stage and the second frame display stage is substantially the same, and thus will not be repeated here. In this example, in the second frame display stage and the third frame display stage, the pixel circuits of the first row to the 1280th row in the display substrate may perform processes of normal data writing and light emitting, while the pixel circuits of the 1281st row to the 2560th row do not perform data writing and emit light using the data signal written in the first frame. This example may achieve the coexistence of high refresh rate and low refresh rate in different region of the display panel within the same frame. In this way, a refresh frequency of a picture (for example, a still picture) may be reduced to achieve the effect of reducing power consumption.

Figure 16:
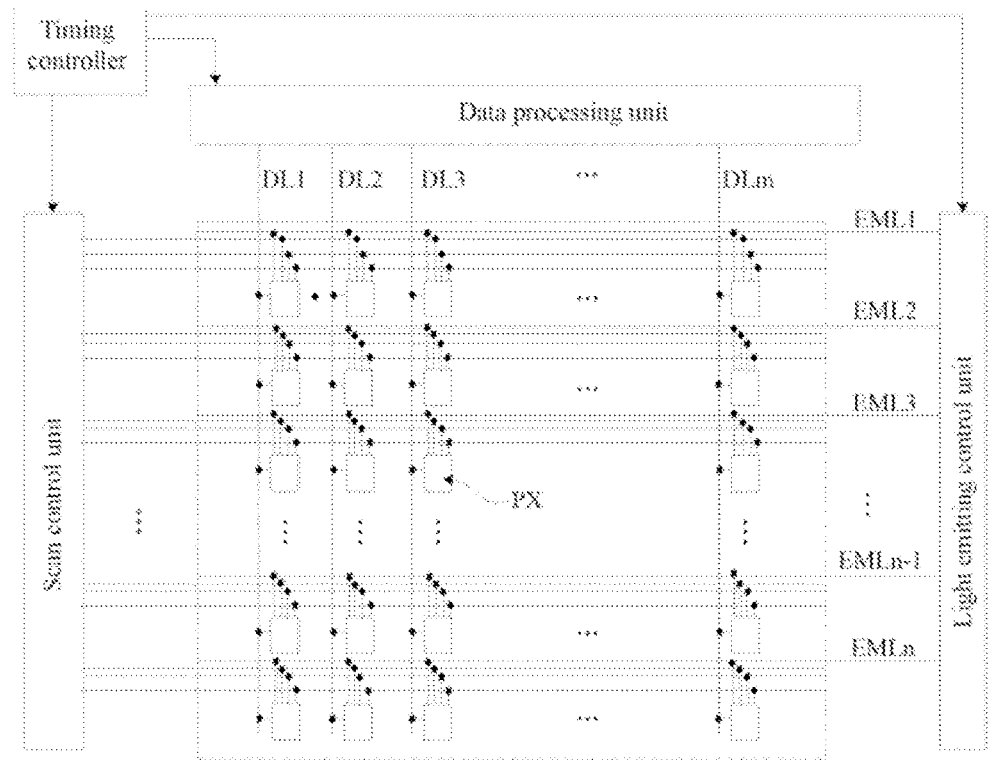
FIG. 16 is a schematic diagram of a structure of a display panel according to at least one embodiment of the present disclosure.

FIG. 16 is a schematic diagram of a structure of a display panel according to at least one embodiment of the present disclosure. In some examples, as shown in FIG. 16, the display panel may include a timing controller, a data processing unit, a scan control unit, a light emitting control unit, and a pixel array, wherein the pixel array may include a plurality of gate lines (e.g. including a first scan line, a second scan line, a first reset control line, and a second reset control line), a plurality of data signal lines (e.g. a DL1 to a DLm), a plurality of light emitting control lines (e.g. an EML1 to an EMLn), and a plurality of sub-pixels PX. Each sub-pixel PX may be connected to a corresponding data signal line, a corresponding gate line, and a corresponding light emitting control line.

In some examples, the timing controller may provide a gray-scale value and a control signal, which are suitable for a specification of the data processing unit, to the data processing unit, may provide a clock signal, a scan start signal, etc., which are suitable for a specification of the scan control unit, to the scan control unit, and may provide a clock signal, an emission stop signal, etc., which are suitable for a specification of the light emitting control unit, to the light emitting control unit. The data processing unit may generate data voltages to be provided to the data signal lines DL1, DL2, DL3, . . . and DLm by means of the gray-scale value and the control signal received from the timing controller, and m may be an integer. For example, the data processing unit may sample the gray-scale value by using a clock signal, and apply a data voltage corresponding to the gray-scale value to the data signal lines DL1 to DLm by taking a pixel row as a unit. The scan control unit may generate a gate drive signal to be provided to the gate line by receiving a clock signal a scan start signal or the like from the timing controller. The light emitting control unit may receive a clock signal, an emission stop signal, etc., from the timing controller to generate a light emitting control signal to be provided to the light emitting control lines EML1, EML2, EML3, . . . , and EMLn. For example, the light emitting control unit may sequentially provide an emission signal with off-level pulse to the light emitting signal lines EML1 to EMLn. For example, the light emitting control unit circuit may be constructed in a form of a shift register, and may generate a light emitting control signal by sequentially transmitting light emitting stop signals provided in a form of an off-level pulse to a next stage circuit under controlling of the clock signal. In some examples, the scan control unit may include a gate drive circuit as provided in the embodiments described above. For example, the scan control unit may include one gate drive circuit providing the second scan signal and the first reset control signal, and another gate drive circuit providing the first scan signal and the second reset control signal. This embodiment is not limited thereto.

In some examples, the data processing unit may also be configured to determine a type of the picture to be displayed and provide a first control signal and a second control signal to the scan control unit according to the type of the picture to be displayed. For example, the type of the picture to be displayed may include a still picture, a dynamic picture, and a still-dynamic combined picture. The data processing unit may identify the type of the picture to be displayed based on the information of the picture to be displayed, determine the boundary information between the still picture and the dynamic picture in the picture to be displayed, and provide a first control signal and a second control signal to the scan control unit according to the boundary information. For example, sub-display regions of the display region may be divided according to the boundary information. For example, a judging condition of the static picture may include that if the characteristic value of a display picture in one frame is consistent with that in a previous frame, the display picture in this frame is determined to be a still picture; and a judging condition of the dynamic picture may include that if the characteristic value of a display picture in one frame is inconsistent with that in a display picture of a previous frame, the display picture in this frame is determined to be a dynamic picture. Herein, the characteristic value may include gray scale. For another example, the picture to be displayed may be divided into a plurality of sub-regions, and a still region and a dynamic region within a display region in one frame are determined according to a comparison of a characteristic value of each sub-region within a display picture in one frame with a characteristic value of a display picture of a previous frame. In some examples, the boundary information determined by the data processing unit may include boundary information between frames; or it may include boundary information within display picture in one frame. However, this embodiment is not limited thereto.

In some examples, the drive control circuit of the scan control unit may receive a first control signal from the first control line, a second control signal from the second control line, and enter a first drive mode or a second drive mode according to the first control signal and the second control signal to control a corresponding pixel circuit to be in the first operation mode or the second operation mode. The descriptions of the first operation mode, the second operation mode, the first drive mode and the second drive mode are as described above, and thus will not be repeated here.

In some examples, a shape of the sub-pixel PX may be a rectangle, a rhombus, a pentagon, or a hexagon. When a pixel unit includes three sub-pixels, the three sub-pixels may be arranged side by side horizontally, side by side vertically, or in a shape of a Chinese character "X". When a pixel unit includes four sub-pixels, the four sub-pixels may be arranged side by side horizontally, side by side vertically, or in a shape of a square. However, this embodiment is not limited thereto.

In some examples, one pixel unit within the display region may include three sub-pixels, which may be a red sub-pixel, a green sub-pixel, and a blue sub-pixel respectively. However, this embodiment is not limited thereto. In some examples, one pixel unit may include four sub-pixels, and the four sub-pixels are a red sub-pixel, a green sub-pixel, a blue sub-pixel, and a white sub-pixel respectively.

In some examples, the timing controller, the data processing unit, the scan control unit and the light emitting control unit may be arranged in a non-display region. Herein, the scan control unit and the light emitting control unit may be arranged on two opposite sides of the display region respectively, which is located, for example, on a left side and a right side of the display region, respectively; and the timing controller and the data processing unit may be arranged on a side of the display region, which is located, for example, on a lower side of the display region. However, this embodiment is not limited thereto.

The display panel provided by this example may reduce the data refresh frequency according to the display demand, and may control the data refresh frequency of the display region through the drive control circuit for selective output, so as to support achieving different refresh rates in different regions of the display region, thus achieving the effect of reducing power consumption.

An embodiment of the present disclosure further provides a display apparatus, which includes the display panel as described above. In some examples, the display panel may be an OLED display panel, a QLED display panel, a Micro-LED display panel, or a Mini-LED display panel. The display apparatus may be any product or component with a display function, such as an OLED display device, a watch, a mobile phone, a tablet computer, a television, a display, a laptop computer, a digital photo frame, and a navigator. However, this embodiment is not limited thereto.

The drawings of the present disclosure only involve structures involved in the present disclosure, and other structures may refer to conventional designs. The embodiments of the present disclosure and features in the embodiments may be combined to each other to obtain new embodiments if there is no conflict. Those of ordinary skills in the art should understand that modifications or equivalent replacements may be made to the technical solutions of the present disclosure without departing from the essence and scope of the technical solutions of the present disclosure, and shall all fall within the scope of the claims of the present disclosure.

The invention claimed is:

1. A drive control circuit, comprising: an input circuit, a first output circuit and a first output control circuit; wherein
the input circuit is electrically connected with a signal input terminal, a clock signal terminal, a first node and a second node, and is configured to control potentials of the first node and the second node under control of the signal input terminal and the clock signal terminal;
the first output circuit is electrically connected to the first node, the second node, a third node, and a first output terminal, and is configured to provide a first power supply signal to the third node under the control of the first node, or to provide a second power supply signal to the first output terminal under the control of the second node; and
the first output control circuit is electrically connected with the third node, a first control terminal and the first output terminal, and is configured to turn on or turn off the third node and the first output terminal under the control of the first control terminal;
wherein the first output control circuit comprises a first output control transistor, a gate of the first output control transistor is electrically connected to the first control terminal, the first control terminal is electrically connected to a first control line, the first control line is configured to provide a first control signal, and an output timing of a high-level signal of the first output terminal is controlled through the first control signal;
wherein the drive control circuit comprises a second output circuit and a second output control circuit; wherein
the second output circuit is electrically connected to the first node, the second node, a fourth node, and a second output terminal, and is configured to provide a third power supply signal to the fourth node under the control of the first node, or to provide a fourth power supply signal to the second output terminal under the control of the second node; and
the second output control circuit is electrically connected with the fourth node, a second control terminal and the second output terminal, and is configured to turn on or turn off the fourth node and the second output terminal under the control of the second control terminal.

2. The drive control circuit according to claim 1, wherein a first electrode of the first output control transistor electrically is connected to the third node, and a second electrode of the first output control transistor is electrically connected to the first output terminal.

3. The drive control circuit according to claim 1, wherein the first output circuit comprises a first output transistor and a second output transistor, a gate of the first output transistor is electrically connected with the first node, a first electrode of the first output transistor is electrically connected with a first power supply line, and a second electrode of the first output transistor is electrically connected with the third node; and
a gate of the second output transistor is electrically connected to the second node, a first electrode of the second output transistor is electrically connected to a second power supply line, and a second electrode of the second output transistor is electrically connected to the first output terminal.

4. The drive control circuit according to claim 1, wherein an output signal of the second output terminal is the same as an output signal of the first output terminal.

5. The drive control circuit according to claim 1 wherein the second output control circuit comprises a second output control transistor, a gate of the second output control transistor is electrically connected to the second control terminal, a first electrode of the second output control transistor is electrically connected to the fourth node, and a second electrode of the second output control transistor is electrically connected to the second output terminal.

6. The drive control circuit according to claim 1, wherein the second output circuit comprises a third output transistor and a fourth output transistor;
a gate of the third output transistor is electrically connected to the first node, a first electrode of the third output transistor is electrically connected to a third power supply line, and a second electrode of the third output transistor is electrically connected to the fourth node; and
a gate of the fourth output transistor is electrically connected to the second node, a first electrode of the fourth output transistor is electrically connected to a fourth power supply line, and a second electrode of the fourth output transistor is electrically connected to the second output terminal.

7. The drive control circuit according to claim 1, wherein the input circuit comprises a first transistor, a second transistor, a third transistor, a fourth transistor, a fifth transistor, a sixth transistor, a seventh transistor, an eighth transistor, a first capacitor, a second capacitor, and a third capacitor;
    a gate of the first transistor is electrically connected with a first clock terminal, a first electrode of the first transistor is electrically connected with the signal input terminal, and a second electrode of the first transistor is electrically connected with a seventh node;
    a gate of the second transistor is electrically connected with the seventh node, a first electrode of the second transistor is electrically connected with the first clock terminal, and a second electrode of the second transistor is electrically connected with a fifth node;
    a gate of the third transistor is electrically connected with the first clock terminal, a first electrode of the third transistor is electrically connected with the second power supply line, and a second electrode of the third transistor is electrically connected with the fifth node;
    a gate of the fourth transistor is electrically connected with a second clock terminal, a first electrode of the fourth transistor is electrically connected with a ninth node, and a second electrode of the fourth transistor is electrically connected with the seventh node;
    a gate of the fifth transistor is electrically connected to the fifth node, a first electrode of the fifth transistor is electrically connected to the first power supply line, and a second electrode of the fifth transistor is electrically connected to the ninth node;
    a gate of the sixth transistor is electrically connected with a sixth node, a first electrode of the sixth transistor is electrically connected with the second clock terminal, and a second electrode of the sixth transistor is electrically connected with an eighth node;
    a gate of the seventh transistor is electrically connected with the second clock terminal, a first electrode of the seventh transistor is electrically connected with the eighth node, and a second electrode of the seventh transistor is electrically connected with the first node;
    a gate of the eighth transistor is electrically connected to the second node, a first electrode of the eighth transistor is electrically connected to the first power supply line, and a second electrode of the eighth transistor is electrically connected to the second node;
    a first electrode plate of the first capacitor is electrically connected to the first node, and a second electrode plate of the first capacitor is electrically connected to the first power supply line;
    a first electrode plate of the second capacitor is electrically connected with the sixth node, and a second electrode plate of the second capacitor is electrically connected with the eighth node; and
    a first electrode plate of the third capacitor is electrically connected to the second clock terminal, and a second electrode plate of the third capacitor is electrically connected to the second node.

8. The drive control circuit according to claim 7, wherein the input circuit further comprises a first voltage stabilizing transistor and a second voltage stabilizing transistor;
    a gate of the first voltage stabilizing transistor is electrically connected with the second power supply line, a first electrode of the first voltage stabilizing transistor is electrically connected with the fifth node, and a second electrode of the first voltage stabilizing transistor is electrically connected with the sixth node; and
    a gate of the second voltage stabilizing transistor is electrically connected with the second power supply line, a first electrode of the second voltage stabilizing transistor is electrically connected with the seventh node, and a second electrode of the second voltage stabilizing transistor is electrically connected with the second node.

9. A gate drive circuit, comprising a plurality of cascaded drive control circuits according to claim 1; wherein a signal input terminal of a first stage drive control circuit is electrically connected with a start signal line, and a signal input terminal of an (i+1)-th stage drive control circuit is electrically connected with a first output terminal of an i-th stage drive control circuit, wherein, i is an integer greater than 0.

10. A drive method of a drive pixel circuit, applied to the drive control circuit according to claim 1, the drive method comprising:
    controlling potentials of the first node and the second node by an input circuit under the control of the signal input terminal and the clock signal terminal;
    in a first drive mode, turning on a third node and a first output terminal by a first output control circuit under the control of a first control terminal, and providing a first power supply signal to the third node by a first output circuit under the control of the first node, or providing a second power supply signal to the first output terminal under the control of the second node; and
    in a second drive mode, turning off the third node and the first output terminal by the first output control circuit under the control of the first control terminal, and providing a second power supply signal to the first output terminal by the first output circuit under the control of the second node.

11. The drive method according to claim 10, further comprising: in the first drive mode, turning on the fourth node and the second output terminal by the second output control circuit under the control of the second control terminal, and providing the third power supply signal to the fourth node by the second output circuit under the control of the first node, or providing the fourth power supply signal to the second output terminal under the control of the second node; and
    in the second drive mode, turning off the fourth node and the second output terminal by the second output control circuit under the control of the second control terminal, and providing the fourth power supply signal to the second output terminal by the second output circuit under the control of the second node.

12. A display panel, comprising: a display region and a non-display region located at a periphery the display region; wherein the display region is provided with a plurality of sub-pixels, and at least one sub-pixel comprises a pixel circuit and a light emitting element, wherein the pixel circuit is electrically connected with the light emitting element; the non-display region is provided with a gate drive circuit comprising a plurality of cascaded drive control circuits; wherein
    the pixel circuit at least comprises a drive sub-circuit, a threshold compensation sub-circuit and a first reset sub-circuit; the drive sub-circuit, the threshold compensation sub-circuit and the first reset sub-circuit are electrically connected with a first pixel node; the threshold compensation sub-circuit and the drive sub-circuit are electrically connected with a third pixel node; the first reset sub-circuit is configured to reset the first pixel node under the control of a first reset control signal; the threshold compensation sub-circuit is configured to turn on the first pixel node and the third pixel node under the control of a second scan signal; and the drive sub-circuit is configured to provide a drive signal to the third pixel node under the control of the first pixel node;

the drive control circuit comprises a first output control circuit; wherein the first output control circuit is electrically connected with a first control terminal, the first output control circuit comprises a first output control transistor, a gate of the first output control transistor is electrically connected to the first control terminal, the first control terminal is electrically connected to a first control line, the first control line is configured to provide a first control signal, and an output timing of a high-level signal of the first output terminal is controlled through the first control signal, and the drive control circuit is electrically connected with the first control line and a first output terminal, and is configured to provide the second scan signal or the first reset control signal to the pixel circuit through the first output terminal under the control of the first control line;

the pixel circuit has a first operation mode and a second operation mode; the pixel circuit is configured to perform a reset, a data writing, and a threshold compensation on the first pixel node in the first operation mode; and the pixel circuit is configured to not perform at least one of one of the following in the second operation mode: a reset on the first pixel node, a data writing on the first pixel node, and a threshold compensation on the first pixel node;

the drive control circuit has a first drive mode and a second drive mode, the drive control circuit is configured to provide an output signal of the first output terminal in the first drive mode to the pixel circuit, so that the pixel circuit is in the first operation mode, and the drive control circuit is further configured to provide an output signal of the first output terminal in the second drive mode to the pixel circuit, so that the pixel circuit is in the second operation mode;

the drive control circuit is further electrically connected to a second control line and a second output terminal; and the drive control circuit is configured to provide a second scan signal to at least one pixel circuit through the first output terminal under the control of the first control line, and to provide the first reset control signal to at least one pixel circuit through the second output terminal under the control of the second control line.

13. The display panel according to claim 12, wherein the drive sub-circuit comprises: a drive transistor, a gate of the drive transistor is electrically connected to the first pixel node, a first electrode of the drive transistor is electrically connected to a second pixel node, and a second electrode of the drive transistor is electrically connected to the third pixel node;

the threshold compensation sub-circuit comprises: a threshold compensation transistor, a gate electrode of the threshold compensation transistor is electrically connected with a second scan line, a first electrode of the threshold compensation transistor is electrically connected with the first pixel node, and a second electrode of the threshold compensation transistor is electrically connected with the third pixel node;

the first reset sub-circuit comprises: a first reset transistor, a gate electrode of the first reset transistor is electrically connected with a first reset control line, a first electrode of the first reset transistor is electrically connected with a first initial signal line, and a second electrode of the first reset transistor is electrically connected with the first pixel node; and the threshold compensation transistor and the first reset transistor have a same transistor type, and the threshold compensation transistor and the drive transistor have different transistor types.

14. The display panel according to claim 12, wherein the display region at least comprises a first sub-display region and a second sub-display region, and a refresh rate of the first sub-display region is different from a refresh rate of the second sub-display region.

15. The display panel according to claim 12, wherein the display region at least comprises a first sub-display region and a second sub-display region; a pixel circuit of the first sub-display region is configured to be in the first operation mode in one frame under the control of the drive control circuit, and a pixel circuit of the second sub-display region is configured to be in the second operation mode in the same frame.

16. The display panel according to claim 12, further comprising: a data processing unit, which is configured to provide the first control signal to the drive control circuit through the first control line, and to provide a second control signal to the drive control circuit through the second control line according to a type of a picture to be displayed.

17. A display apparatus, comprising a display panel according to claim 12.

* * * * *